United States Patent
Qiu et al.

(10) Patent No.: US 11,153,825 B2
(45) Date of Patent: Oct. 19, 2021

(54) POWER CONSUMPTION CONTROL METHOD AND APPARATUS

(71) Applicant: HUAWEI TECHNOLOGIES CO., LTD., Guangdong (CN)

(72) Inventors: Fengguang Qiu, Shanghai (CN); Xiangtao Yu, Beijing (CN); Gang Wang, Beijing (CN); Guangyong Hu, Shanghai (CN); Qiuhong Yuan, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/639,308

(22) PCT Filed: Aug. 10, 2018

(86) PCT No.: PCT/CN2018/100041
§ 371 (c)(1),
(2) Date: Feb. 14, 2020

(87) PCT Pub. No.: WO2019/034001
PCT Pub. Date: Feb. 21, 2019

(65) Prior Publication Data
US 2020/0252875 A1    Aug. 6, 2020

(30) Foreign Application Priority Data

Aug. 18, 2017  (CN) .......................... 201710711887.9
Nov. 14, 2017  (CN) .......................... 201711123467.5

(51) Int. Cl.
*H04W 52/02* (2009.01)

(52) U.S. Cl.
CPC .............................. *H04W 52/0248* (2013.01)

(58) Field of Classification Search
CPC ........... H04W 76/048; H04W 72/1289; H04W 72/14; H04W 76/068; H04W 72/1284;
(Continued)

(56) References Cited

U.S. PATENT DOCUMENTS

| 10,085,213 B1 * | 9/2018 | Nimmala | .......... H04W 52/0229 |
| 2009/0046649 A1 * | 2/2009 | Gao | ....................... H04L 1/1861 370/329 |

(Continued)

FOREIGN PATENT DOCUMENTS

| CN | 101202712 A | 6/2008 |
| CN | 101834655 A | 9/2010 |

(Continued)

OTHER PUBLICATIONS

International Search Report for PCT/CN2018/100041 dated Nov. 12, 2018, 4 pages.

(Continued)

*Primary Examiner* — Jung Liu

(57) ABSTRACT

Embodiments of this application provide a power consumption control method and an apparatus, relate to the field of communications technologies, and are used to reduce power consumption of user equipment and ensure communication performance of the user equipment. The method is applied to user equipment that includes a baseband processor, and the method includes: obtaining, by the baseband processor, modem traffic information; sending, by the baseband processor, indication information to a base station when the modem traffic information meets a condition, where the indication information is used to instruct the base station to adjust a connected discontinuous reception (CDRX) cycle of the user equipment; receiving, by the baseband processor, first configuration information sent by the base station, where the first configuration information includes CDRX information of the user equipment; and configuring, by the (Continued)

baseband processor, the CDRX cycle of the user equipment by using the first configuration information.

20 Claims, 9 Drawing Sheets

(58) Field of Classification Search
CPC ..... H04W 88/02; H04W 76/28; H04W 76/38; H04W 52/0216; H04W 72/12; H04W 72/044; H04W 8/08; H04W 48/18; H04W 72/048; H04W 8/18; H04M 7/006; Y02D 30/70; H04L 65/60
See application file for complete search history.

(56) References Cited

U.S. PATENT DOCUMENTS

| | | | |
|---|---|---|---|
| 2010/0234035 A1 | 9/2010 | Fujishima et al. | |
| 2013/0045770 A1 | 2/2013 | Aschan et al. | |
| 2013/0229965 A1* | 9/2013 | Bressanelli | H04W 68/005 370/311 |
| 2013/0265987 A1* | 10/2013 | Ramachandran | H04W 36/0033 370/331 |
| 2013/0308511 A1 | 11/2013 | Ljung | |
| 2014/0169324 A1* | 6/2014 | Seo | H04L 5/0037 370/329 |
| 2015/0282030 A1* | 10/2015 | Vrind | H04W 76/28 370/311 |
| 2015/0304883 A1 | 10/2015 | Tabet et al. | |
| 2015/0304955 A1 | 10/2015 | Manepalli et al. | |
| 2016/0219518 A1* | 7/2016 | Zhao | H04W 76/28 |
| 2016/0278159 A1* | 9/2016 | Ljung | H04W 4/70 |
| 2016/0295516 A1* | 10/2016 | Su | H04W 28/0221 |
| 2017/0019820 A1* | 1/2017 | Das | H04W 36/0016 |
| 2017/0034869 A1 | 2/2017 | Vangala et al. | |
| 2017/0104507 A1* | 4/2017 | Fernando | H04B 1/16 |
| 2017/0118269 A1* | 4/2017 | Park | H04L 69/16 |
| 2017/0150386 A1* | 5/2017 | Hoover | H04W 36/0088 |
| 2017/0156157 A1* | 6/2017 | Zhang | H04W 72/1278 |
| 2017/0359780 A1* | 12/2017 | Ji | H04L 1/1829 |
| 2018/0070404 A1* | 3/2018 | Giguet | H04W 24/02 |
| 2018/0343686 A1* | 11/2018 | Manepalli | H04W 76/28 |
| 2018/0359789 A1* | 12/2018 | Yang | H04W 76/28 |
| 2019/0045577 A1* | 2/2019 | Kim | H04W 76/28 |
| 2020/0128467 A1* | 4/2020 | Gao | H04W 36/32 |

FOREIGN PATENT DOCUMENTS

| | | |
|---|---|---|
| CN | 102395180 A | 3/2012 |
| CN | 102932882 A | 2/2013 |
| CN | 103079285 A | 5/2013 |
| CN | 103428773 A | 12/2013 |
| CN | 103430602 A | 12/2013 |
| CN | 103546925 A | 1/2014 |
| CN | 105025557 A | 11/2015 |
| CN | 105050165 A | 11/2015 |
| CN | 105188110 A | 12/2015 |
| CN | 105282048 A | 1/2016 |
| CN | 105682135 A | 6/2016 |
| CN | 105933964 A | 9/2016 |
| CN | 106465268 A | 2/2017 |
| CN | 106973427 A | 7/2017 |
| EP | 2579671 B1 | 7/2017 |
| WO | 2013171577 A1 | 11/2013 |

OTHER PUBLICATIONS

R2-122587 Ericsson, ST-Ericsson, "About DRX configuration and UE assistance", 3GPP TSG-RAN WG2 #78, Prague, Czech Republic, May 21-25, 2012, total 7 pages.

R2-121465 Samsung, "Assistance information from UE to eNB for eDDA", 3GPP TSG-RAN WG2 #77Bis, Jeju, Korea, Mar. 26-Mar. 30, 2012, total 4 pages.

Extended European Search Report issued in EP Application No. 18846567.8, dated Jun. 17, 2020, total 7 pages.

* cited by examiner

POWER CONSUMPTION CONTROL METHOD AND APPARATUS

CROSS-REFERENCE TO RELATED APPLICATION

This application is a national stage of International Application No. PCT/CN2018/100041, filed on Aug. 10, 2018, which claims priority to Chinese Patent Application No. 201711123467.5, filed on Nov. 14, 2017 and Chinese Patent Application No. 201710711887.9, filed on Aug. 18, 2017. All of the aforementioned applications are hereby incorporated by reference in their entireties.

TECHNICAL FIELD

Embodiments of this application relate to the field of communications technologies, and in particular, to a power consumption control method and an apparatus.

BACKGROUND

With rapid development of communications technologies, user equipment such as a mobile phone, a tablet computer, and a wearable device are increasingly used. In a use process, the user equipment is in a screen-off state most of the time. In this case, power consumption of a modem in the user equipment is relatively high, and the power consumption of the modem is mainly generated when the user equipment is in a connected mode. Therefore, power consumption of the user equipment in the connected mode when the screen is off needs to be controlled.

The power consumption of the user equipment in the connected mode is related to a connected discontinuous reception (CDRX) cycle configuration parameter. In the prior art, there are the following two power consumption control methods: In a first method, an application processor (AP) detects service status information in real time, and collects moving speed information of user equipment, the AP transmits the service status information and the moving speed information to a modem, and the modem reports the service status information and the moving speed information to a base station; and the base station generates a new CDRX cycle parameter for the user equipment by using the reported service status information and moving speed information, and configures the new CDRX cycle parameter for the user equipment by using Radio Resource Control (RRC). In a second method, an AP detects service status information and application traffic information in real time, generates a new CDRX cycle parameter based on the detected service status information and application traffic information, and transmits the new CDRX cycle parameter to a modem; and the modem sends a CDRX request to a base station, and the base station configures the new CDRX cycle parameter for user equipment by using RRC.

In the foregoing first method, the user equipment and the base station need to agree in advance on information such as a service name identifier related to a service status and whether a service is a real-time service. When information such as a new service name needs to be added, the user equipment and the base station need to be synchronously upgraded, resulting in relatively high costs. In addition, the service information and the moving speed information of the user equipment belong to personal information of a user. It is likely to cause leakage of the personal information in a transmission process. In the second method, the AP generates the new CDRX cycle parameter for the user equipment. Because the AP can only obtain traffic information of an application layer, accuracy of the CDRX cycle parameter generated only based on the traffic information of the application layer is relatively low. Therefore, a power consumption control effect for the user equipment is relatively poor.

SUMMARY

Embodiments of this application provide a power consumption control method and an apparatus, so as to resolve a conventional problem that power consumption control of user equipment is relatively poor.

To achieve the foregoing objective, the embodiments of this application use the following technical solutions:

According to a first aspect, a power consumption control method is provided. The method is applied to user equipment that includes a baseband processor modem, and the method includes: obtaining, by the baseband processor, modem traffic information; sending, by the baseband processor, indication information to a base station when the modem traffic information meets a preset condition, where the indication information is used to instruct the base station to adjust a CDRX cycle of the user equipment; receiving, by the baseband processor, first configuration information sent by the base station, where the first configuration information includes CDRX information of the user equipment; and configuring, by the baseband processor, the CDRX cycle of the user equipment by using the first configuration information. In the foregoing technical solution, the baseband processor obtains the modem traffic information to adjust the CDRX cycle of the user equipment, thereby reducing power consumption of the user equipment and ensuring better communication performance of the user equipment. Compared with the prior art, in the power consumption control method provided in this application, only the modem needs to be awake, and the AP may be in a sleep state, thereby saving power more.

In a possible implementation of the first aspect, the modem traffic information includes at least one of the following information: an uplink grant ratio and/or a downlink grant ratio, an uplink subframe ratio and/or a downlink subframe ratio, and uplink data traffic and/or downlink data traffic; and the uplink subframe ratio is determined based on an actual quantity of retransmission times of a same uplink grant, the downlink subframe ratio is determined based on an actual quantity of retransmission times of a same downlink grant, the uplink data traffic is determined based on a quantity of uplink grants and a transport block size (TBS) of each uplink grant, and the downlink data traffic is determined based on a quantity of downlink grants and a transport block size (TBS) of each downlink grant. In the foregoing possible technical solution, the baseband processor may accurately and effectively obtain any type of modem traffic information, so as to determine whether the modem traffic information meets the preset condition, so as to send, to the base station, the indication information used to instruct the base station to adjust the CDRX.

In a possible implementation of the first aspect, the modem traffic information includes the downlink grant ratio, the downlink subframe ratio, or the downlink data traffic, and the sending, by the baseband processor, indication information to a base station when the modem traffic information meets a preset condition includes: sending, by the baseband processor, first indication information to the base station when the modem traffic information meets a first preset condition, where the first indication information is used to instruct the base station to increase a long DRX cycle in the CDRX of the user equipment, or the first indication information is used to instruct the base station to adjust the CDRX of the user equipment to a first cycle, a long DRX cycle in the first cycle is greater than a long DRX cycle in the current CDRX cycle of the user equipment, and the indication information includes the first indication information; and the first preset condition includes that the modem traffic information is less than a first threshold. In the foregoing possible technical solution, when the modem traffic information is less than the first threshold, after the base station adjusts the CDRX cycle of the user equipment by using the first indication information, power consumption of the user equipment can be reduced, and power can be saved, thereby increasing power usage time of the user equipment.

In a possible implementation of the first aspect, after the baseband processor sends the first indication information to the base station, the method further includes: disabling, by the baseband processor, the short DRX cycle in the CDRX of the user equipment. In the foregoing possible technical solution, power consumption of the user equipment can be further reduced.

In a possible implementation of the first aspect, the user equipment further meets the following conditions: there is no dedicated bearer on the user equipment, channel quality of the user equipment is greater than a specified threshold, the user equipment is in a screen-off state, and there is no Over The Top (OTT) call on the user equipment. In the foregoing possible technical solution, after determining that the user equipment meets the foregoing conditions, the baseband processor sends the first indication information to the base station, so as to implement adjustment on the CDRX of the user equipment by the base station, thereby improving accuracy of adjusting the CDRX cycle.

In a possible implementation of the first aspect, the modem traffic information includes the uplink grant ratio, the uplink subframe ratio, or the uplink data traffic, and the sending, by the baseband processor, indication information to a base station when the modem traffic information meets a preset condition includes: sending, by the baseband processor, second indication information to the base station when the modem traffic information meets a second preset condition, where the second indication information is used to instruct the base station to reduce a long DRX cycle in the CDRX of the user equipment, or the second indication information is used to instruct the base station to adjust the CDRX of the user equipment to a second cycle, a long DRX cycle in the second cycle is less than a long DRX cycle in the current CDRX cycle of the user equipment, and the indication information further includes the second indication information; and the second preset condition includes that the modem traffic information is greater than a second threshold. In the foregoing possible technical solution, when the modem traffic information is greater than the second threshold, after the base station adjusts the CDRX cycle of the user equipment by using the second indication information, that the user equipment has better communication performance can be ensured, so as to not affect use of a user and improve user experience.

In a possible implementation of the first aspect, when the second indication information is used to instruct the base station to adjust the CDRX of the user equipment to the second cycle, the second cycle is a default CDRX cycle. In the foregoing possible technical solution, the default CDRX cycle is a relatively preferred CDRX cycle configured by the base station. In this way, not only better communication performance of the user equipment can be ensured, but also no additional power consumption is brought to the user equipment, thereby improving user experience.

In a possible implementation of the first aspect, the user equipment further meets at least one of the following conditions: there is a dedicated bearer on the user equipment, channel quality of the user equipment is less than or equal to a specified threshold, the user equipment is in a screen-on state, and there is an OTT call on the user equipment. In the foregoing possible technical solution, after determining that the user equipment meets the at least one of the foregoing conditions, the baseband processor sends the second indication information to the base station, so as to implement adjustment on the CDRX of the user equipment by the base station, thereby improving accuracy of adjusting the CDRX cycle.

In a possible implementation of the first aspect, the modem traffic information includes the downlink grant ratio, the downlink subframe ratio, or the downlink data traffic. The method further includes: sending, by the baseband processor, third indication information to the base station when modem traffic information of the user equipment in M consecutive current CDRX cycles of the user equipment is less than a third threshold, and the user equipment is in the screen-off state, where the third indication information is used to instruct the base station to release an RRC connection of the user equipment, and M is a positive integer. In the foregoing possible technical solution, the base station releases an RRC connection of the user equipment by using the third indication information, so that power consumption of the user equipment can be reduced, and power can be saved, and further power use time of the user equipment is increased.

In a possible implementation of the first aspect, the method further includes: sending, by the baseband processor, fourth indication information to the base station when the user equipment has no uplink data to be sent and modem traffic information in N consecutive current CDRX cycles of the user equipment is less than a fourth threshold, where the fourth indication information is used to indicate, to the base station, that the user equipment enters idle DRX, and N is a positive integer.

In a possible implementation of the first aspect, the method further includes: sending, by the baseband processor, fifth indication information to the base station when the baseband processor obtains real-time service information, where the fifth indication information is used to instruct the base station to disable the CDRX of the user equipment. In the foregoing possible technical solution, when the baseband processor obtains the real-time service information, the baseband processor may send the fifth indication information to the base station to instruct to disable the CDRX of the user equipment. This can ensure that the user equipment has better communication performance, thereby not affecting use of the user and improving user experience.

According to a second aspect, user equipment is provided, where the user equipment includes a baseband processor, and the baseband processor includes a processing unit, configured to obtain modem traffic information; a sending unit, configured to send indication information to a base station when the modem traffic information meets a preset condition, where the indication information is used to instruct the base station to adjust a CDRX cycle of the user equipment; and a receiving unit, configured to receive first configuration information sent by the base station, where the first configuration information includes CDRX information of the user equipment; and the processing unit is further configured to configure the CDRX cycle of the user equipment by using the first configuration information.

In a possible implementation of the second aspect, the modem traffic information includes at least one of the following information: an uplink grant ratio and/or a downlink grant ratio, an uplink subframe ratio and/or a downlink subframe ratio, and uplink data traffic and/or downlink data traffic; and the uplink subframe ratio is determined based on an actual quantity of retransmission times of a same uplink grant, the downlink subframe ratio is determined based on an actual quantity of retransmission times of a same downlink grant, the uplink data traffic is determined based on a quantity of uplink grants and a transport block size (TBS) of each uplink grant, and the downlink data traffic is determined based on a quantity of downlink grants and a TBS of each downlink grant.

In a possible implementation of the second aspect, the modem traffic information includes the downlink grant ratio, the downlink subframe ratio, or the downlink data traffic, and the sending unit is specifically configured to send first indication information to the base station when the modem traffic information meets a first preset condition, where the first indication information is used to instruct the base station to increase a long DRX cycle in the CDRX of the user equipment, or the first indication information is used to instruct the base station to adjust the CDRX of the user equipment to a first cycle, a long DRX cycle in the first cycle is greater than a long DRX cycle in the current CDRX cycle of the user equipment, and the indication information includes the first indication information; and the first preset condition includes that the modem traffic information is less than a first threshold.

In a possible implementation of the second aspect, when the CDRX of the user equipment further includes a short DRX cycle, the first indication information is further used to instruct the base station to disable the short DRX cycle in the CDRX of the user equipment.

In a possible implementation of the second aspect, the user equipment further meets the following conditions: there is no dedicated bearer on the user equipment, channel quality of the user equipment is greater than a specified threshold, the user equipment is in a screen-off state, and there is no OTT call on the user equipment.

In a possible implementation of the second aspect, the modem traffic information includes the uplink grant ratio, the uplink subframe ratio, or the uplink data traffic, and the sending unit is specifically configured to send second indication information to the base station when the modem traffic information meets a second preset condition, where the second indication information is used to instruct the base station to reduce a long DRX cycle in the CDRX, or the second indication information is used to instruct the base station to adjust the CDRX to a second cycle, a long DRX cycle in the second cycle is less than a long DRX cycle in the current CDRX cycle, and the indication information further includes the second indication information; and the second preset condition includes that the modem traffic information is greater than a second threshold.

In a possible implementation of the second aspect, when the second indication information is used to instruct the base station to adjust the CDRX to the second cycle, the second cycle is a default CDRX cycle.

In a possible implementation of the second aspect, the user equipment further meets at least one of the following conditions: there is a dedicated bearer on the user equipment, channel quality of the user equipment is less than or equal to a specified threshold, the user equipment is in a screen-on state, and there is an OTT call on the user equipment.

In a possible implementation of the second aspect, the sending unit is further configured to: send third indication information to the base station when modem traffic information of the user equipment in M consecutive current CDRX cycles of the user equipment is less than a third threshold, and the user equipment is in a screen-off state, where the third indication information is used to instruct the base station to release an RRC connection of the user equipment, and M is a positive integer.

In a possible implementation of the second aspect, the sending unit is further configured to send fourth indication information to the base station when the user equipment has no uplink data to be sent and modem traffic information in N consecutive current CDRX cycles of the user equipment is less than a fourth threshold, where the fourth indication information is used to indicate, to the base station, that the user equipment enters idle DRX, and N is a positive integer.

In a possible implementation of the second aspect, the sending unit is further configured to: send fifth indication information to the base station when the user equipment obtains the real-time service information, where the fifth indication information is used to instruct the base station to disable the CDRX of the user equipment; and the receiving unit is further configured to: receive second configuration information sent by the base station, and disable the CDRX of the user equipment based on the second configuration information.

According to a third aspect, user equipment is provided, where the user equipment includes an application processor, a baseband processor, a memory, and a computer program, where the computer program is stored in the memory, the computer program includes an instruction, and when the instruction is executed by the user equipment, the baseband processor performs the following steps: obtaining modem traffic information; sending indication information to a base station when the modem traffic information meets a preset condition, where the indication information is used to instruct the base station to adjust a CDRX cycle of the user equipment; receiving first configuration information sent by the base station, where the first configuration information includes CDRX information of the user equipment; and configuring the CDRX cycle of the user equipment by using the first configuration information.

In a possible implementation of the third aspect, the modem traffic information includes at least one of the following information: an uplink grant ratio and/or a downlink grant ratio, an uplink subframe ratio and/or a downlink subframe ratio, and uplink data traffic and/or downlink data traffic; and the uplink subframe ratio is determined based on an actual quantity of retransmission times of a same uplink grant, the downlink subframe ratio is determined based on an actual quantity of retransmission times of a same downlink grant, the uplink data traffic is determined based on a quantity of uplink grants and a transport block size (TBS) of each uplink grant, and the downlink data traffic is determined based on a quantity of downlink grants and a TBS of each downlink grant.

In a possible implementation of the third aspect, the modem traffic information includes the downlink grant ratio, the downlink subframe ratio, or the downlink data traffic, and the baseband processor is specifically configured to send first indication information to the base station when the modem traffic information meets the first preset condition, where the first indication information is used to instruct the base station to increase a long DRX cycle in the CDRX of the user equipment, or the first indication information is used to instruct the base station to adjust the CDRX of the user equipment to a first cycle, a long DRX cycle in the first cycle is greater than a long DRX cycle in the current CDRX cycle of the user equipment, and the indication information includes the first indication information; and the first preset condition includes that the modem traffic information is less than a first threshold.

In a possible implementation of the third aspect, when the CDRX of the user equipment further includes a short DRX cycle, the first indication information is further used to instruct the base station to disable the short DRX cycle in the CDRX of the user equipment.

In a possible implementation of the third aspect, the user equipment further meets the following conditions: there is no dedicated bearer on the user equipment, channel quality of the user equipment is greater than a specified threshold, the user equipment is in a screen-off state, and there is no OTT call on the user equipment.

In a possible implementation of the third aspect, the modem traffic information includes the uplink grant ratio, the uplink subframe ratio, or the uplink data traffic, and the baseband processor is specifically configured to send second indication information to the base station when the modem traffic information meets a second preset condition, where the second indication information is used to instruct the base station to reduce a long DRX cycle in the CDRX, or the second indication information is used to instruct the base station to adjust the CDRX to a second cycle, a long DRX cycle in the second cycle is less than a long DRX cycle in the current CDRX cycle, and the indication information further includes the second indication information; and the second preset condition includes that the modem traffic information is greater than a second threshold.

In a possible implementation of the third aspect, when the second indication information is used to instruct the base station to adjust the CDRX to the second cycle, the second cycle is a default CDRX cycle.

In a possible implementation of the third aspect, the user equipment further meets at least one of the following conditions: there is a dedicated bearer on the user equipment, channel quality of the user equipment is less than or equal to a specified threshold, the user equipment is in a screen-on state, and there is an Over The Top (OTT) call on the user equipment.

In a possible implementation of the third aspect, the baseband processor is further configured to: send third indication information to the base station when modem traffic information of the user equipment in M consecutive current CDRX cycles of the user equipment is less than a third threshold, and the user equipment is in a screen-off state, where the third indication information is used to instruct the base station to release an RRC connection of the user equipment, and M is a positive integer.

In a possible implementation of the third aspect, the baseband processor is further configured to: send fourth indication information to the base station when the user equipment has no uplink data to be sent and modem traffic information in N consecutive current CDRX cycles of the user equipment is less than a fourth threshold, where the fourth indication information is used to indicate, to the base station, that the user equipment enters idle DRX, and N is a positive integer.

In a possible implementation of the third aspect, the baseband processor is further configured to: send fifth indication information to the base station when the user equipment obtains the real-time service information, where the fifth indication information is used to instruct the base station to disable the CDRX of the user equipment; and receive second configuration information sent by the base station, and disable the CDRX of the user equipment based on the second configuration information.

According to another aspect, this application further provides a computer readable storage medium, where the computer readable storage medium stores instructions. When the instructions run in a computer, the computer is enabled to perform the power consumption control method according to any one of the first aspect or the possible implementations of the first aspect.

According to still another aspect, this application provides a computer program product including instructions. When the computer program product runs on a computer, the computer is enabled to perform the power consumption control method according to any one of the first aspect or the possible implementations of the first aspect.

According to yet another aspect, this application provides a communications system, and the communications system includes user equipment and a base station, where the user equipment is the user equipment provided in any one of the foregoing aspects, and is configured to support the user equipment in performing the power consumption control method according to any one of the first aspect or the possible implementations of the first aspect.

It may be understood that any power consumption control apparatus, any computer storage medium, or any computer program product provided above is configured to perform a corresponding method provided above. Therefore, for advantageous effects that can be achieved by any power consumption control apparatus, any computer storage medium, or any computer program product, refer to advantageous effects in a corresponding method provided above.

DESCRIPTION OF EMBODIMENTS

Before embodiments of this application are described, the technical terms involved in the embodiments of this application are described first.

Discontinuous reception (DRX) means that user equipment (UE) stops monitoring a physical downlink control channel (PDCCH) within a period of time. Because a data flow based on a packet is often abrupt, when data transmission is not performed, power consumption may be reduced by disabling a receiving circuit (that is, stopping monitoring the PDCCH) of the user equipment, thereby prolonging use time of a power supply of the user equipment.

The DRX may be classified into two types: idle discontinuous reception (Idle DRX) and connected discontinuous reception (Connected DRX, CDRX). This application mainly relates to how to configure a proper CDRX cycle for the user equipment, so as to reduce power consumption.

Figure 1:
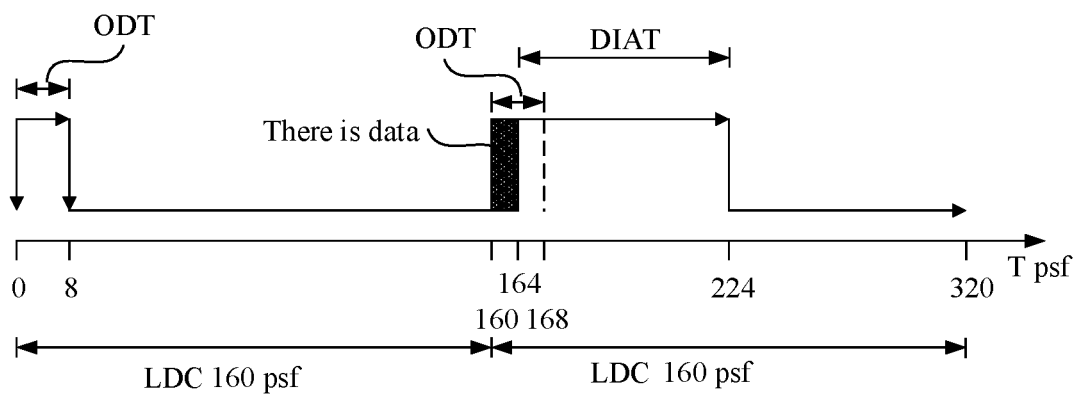
FIG. 1 is a schematic diagram of a time sequence of a parameter in a connected discontinuous reception CDRX cycle.

FIG. 1 is a schematic diagram of a time sequence in a connected discontinuous reception CDRX cycle. The discontinuous reception CDRX cycle may specifically include an on-duration timer (ODT), a DRX inactive timer (DIAT), and a long DRX cycle (LDC). In FIG. 1, psf is an abbreviation of physical subframe. When each LDC starts, the user equipment enters a wake-up state to monitor the PDCCH, and wake-up duration is ODT duration. In a process of monitoring the PDCCH, if the user equipment does not obtain data through monitoring, and the user equipment enters a sleep state until the LDC ends. In a process of monitoring the PDCCH, if the user equipment obtains data through monitoring, the user equipment keeps in a wake-up state and continues to monitor PDCCH DIAT duration. In addition, the CDRX may further include a short DRX cycle (SDC), and the LDC and the SDC are cycles classified based on a DRX type. When CRDX is configured for the user equipment, and the CRDX includes an LDC and an SDC, the user equipment may switch between the LDC and the SDC. For details of the DRX, refer to section 5.7 Discontinuous Reception (DRX) of 3GPP protocol 36.331.

Specifically, that CDRX is configured for the user equipment may be understood as follows: In each long DRX cycle (for example, 160 ms), a modem of the user equipment is woken up for at least ODT duration (for example, 8 ms); and when the user equipment receives data in the time period, the modem needs to be further woken up for DIAT duration (for example, 60 ms). Therefore, in a scenario in which a downlink data packet is relatively sparse, the modem of the user equipment is frequently woken up and continuously in a receiving state. This causes relatively large power consumption of the modem of the user equipment.

Based on this, the embodiments of this application provide a power consumption control method and an apparatus, and a baseband processor of user equipment directly detects information about a media access control MAC packet (modem traffic information), so as to control power consumption of the user equipment. In the prior art, an AP cannot detect the modem traffic information. In some embodiments of this application, the application processor AP may not need to be in a wake-up state. The modem traffic information obtained by the baseband processor may directly reflect traffic information between the modem of the user equipment and a base station. Therefore, compared with the prior art, the method provided in embodiments of this application can reduce power consumption of the modem of the user equipment and ensure communication performance of the user equipment.

Figure 2:
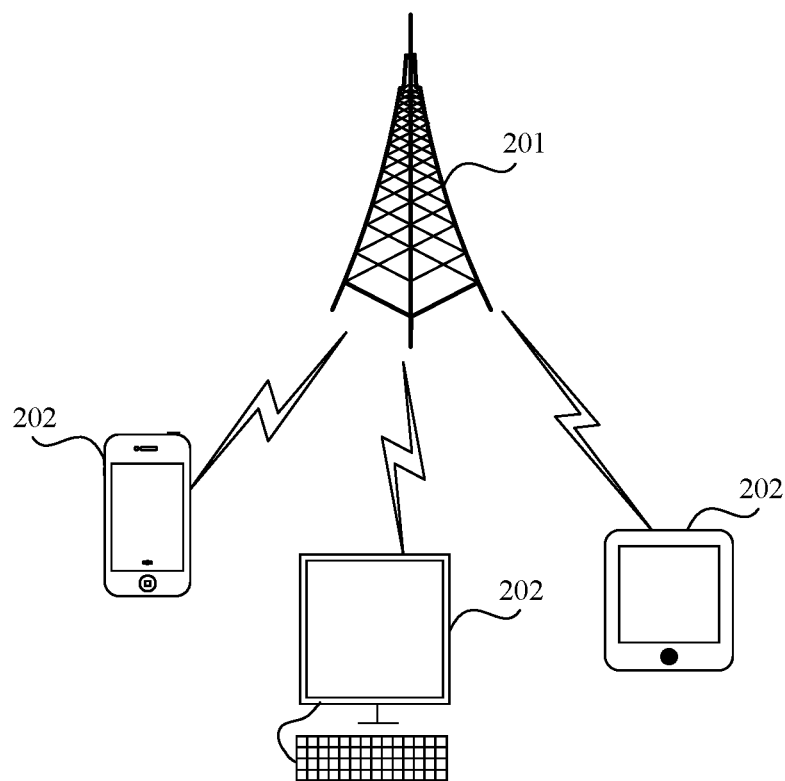
FIG. 2 is a schematic structural diagram of a communications system according to an embodiment of this application.

FIG. 2 is a schematic structural diagram of a communications system to which an embodiment of this application is applied. Referring to FIG. 2, the communications system includes a base station 201 and user equipment 202. The base station 201 may be a macro base station, a micro base station, a relay device, an access point device, a NodeB, or an evolved NodeB (eNodeB). For ease of description, in embodiments of this application, they are collectively referred to as a base station. The base station 201 has a scheduling function of a shared channel, and has a function of establishing scheduling based on packet data sent to the user equipment 202. Scheduling is that when a plurality of pieces of user equipment share a transmission resource, a mechanism is required to effectively allocate a physical layer resource. The user equipment has a function of sending and receiving data by using a communication channel established between the user equipment and the base station. The user equipment 202 sends or receives the shared channel based on information sent though a scheduling control channel In addition, the user equipment 202 may be a mobile station, a mobile phone, a tablet computer, a computer, a wearable device, a vehicle-mounted device, an electronic terminal, a portable terminal, or the like. For ease of description, in embodiments of this application, they are collectively referred to as user equipment or UE.

Data is received and sent between the base station and the user equipment by using a communication channel. The communication channel may be a wireless communication channel In the wireless communication channel, there may be at least a shared channel and a scheduling control channel. The shared channel is shared between a plurality of pieces of user equipment for sending and receiving packets. The scheduling control channel is used to send allocation of the shared channel and a corresponding scheduling result.

Figure 3:
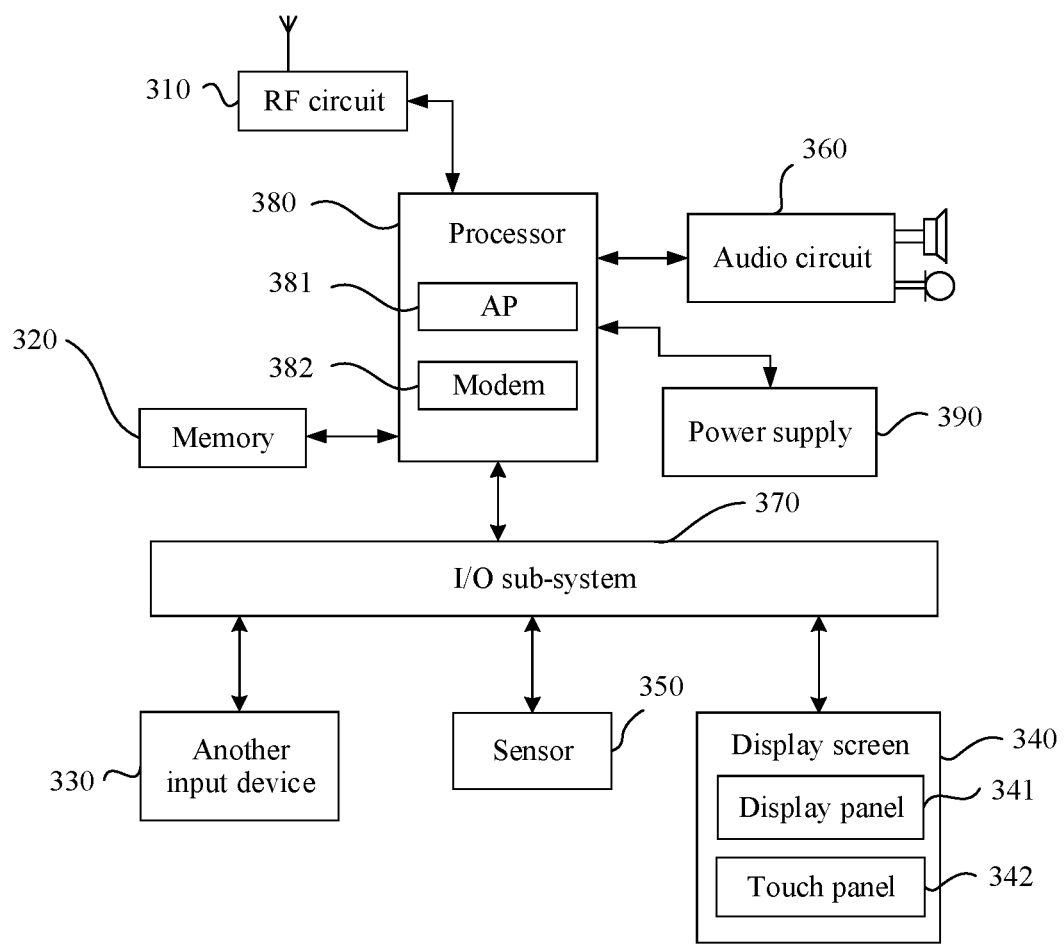
FIG. 3 is a schematic structural diagram of user equipment according to an embodiment of this application.

FIG. 3 is a schematic structural diagram of user equipment according to an embodiment of this application. That the user equipment is a mobile phone is used as an example. The mobile phone may include components such as an RF (radio frequency) circuit 310, a memory 320, another input device 330, a display screen 340, a sensor 350, an audio circuit 360, an I/O subsystem 370, a processor 380, and a power supply 390. The following describes each component of the mobile phone in detail with reference to FIG. 3.

The processor 380 is respectively connected to the RF circuit 310, the memory 320, the audio circuit 360, and the power supply 390. The I/O subsystem 370 is respectively connected to the another input device 330, the display screen 340, and the sensor 350. The RF circuit 310 may be configured to receive and send information, or to receive and send a signal in a call process. Particularly, after receiving downlink information of a base station, the RF circuit 380 sends the downlink information to the processor 380 for processing. The memory 320 may be configured to store a software program and a module. The processor 380 executes various functional applications and data processing of the mobile phone by running the software program and the module that are stored in the memory 320. The processor 380 may include an application processor (AP) 381 and a baseband processor (modem) 382. The baseband processor may also be referred to as a modem. An operating system, a user interface, an application program, and the like of the mobile phone may run and process on the AP 381, and a communications function may be processed on the baseband processor 382. The another input device 330 may be configured to receive entered digit or character information, and generate a key signal input related to user setting and function control of the mobile phone. The display screen 340 may be configured to display information entered by a user or information provided for a user and various menus of the mobile phone, and may be further configured to accept an input of the user. The display screen 340 may include a display panel 341 and a touch panel 342. The sensor 350 may be an optical sensor, a motion sensor, or another sensor. The audio circuit 360 may provide an audio interface between the user and the mobile phone. The I/O subsystem 370 is configured to control an external input/output device, and the external device may include another input device controller, a sensor controller, and a display controller. The processor 380 is a control center of the mobile phone, connects various parts of the entire mobile phone by using various interfaces and lines, and performs various functions of the mobile phone and data processing by running or executing the software program and/or the module stored in the memory 320 and by invoking data stored in the memory 320, to perform overall monitoring on the mobile phone. The power supply 390 (such as a battery) is configured to supply power to each part. Preferably, the power supply may be logically connected to the processor 380 by using a power supply management system, so as to implement, by using the power supply management system, functions such as management of charging, discharging, and power consumption.

A person skilled in the art may understand that the structure of the mobile phone shown in FIG. 3 does not constitute any limitation on the mobile phone. The mobile phone may include components more or fewer than those shown in the figure, or combine some components, or have a different component arrangement.

Figure 4:
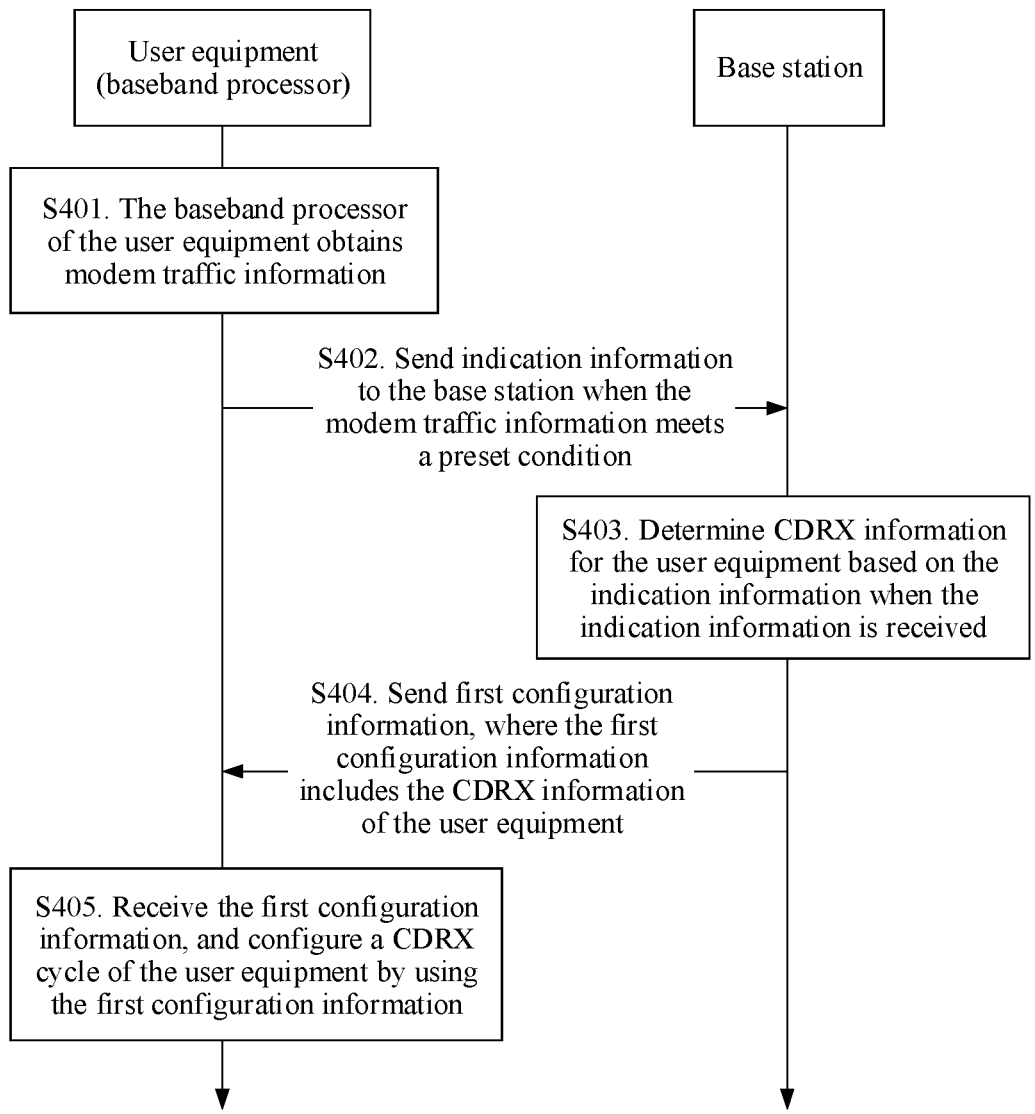
FIG. 4 is a schematic flowchart of a power consumption control method according to an embodiment of this application.

FIG. 4 is a schematic flowchart of a power consumption control method according to an embodiment of this application. Referring to FIG. 4, the method includes the following steps.

S401. A baseband processor obtains modem traffic information.

When CDRX is configured for user equipment, CDRX cycle information is shared between the user equipment and a base station, and the user equipment and the base station run synchronously based on a current CDRX cycle. The base station sends data to the user equipment in an ODT and a DIAT of the current CDRX cycle. Correspondingly, the user equipment receives, in this process, the data sent by the base station, so that the baseband processor in the user equipment can obtain the modem traffic information. Specifically, when the baseband processor obtains the modem traffic information, the baseband processor may obtain modem traffic information in a period of time. The period of time may be a specified duration (for example, 1 s), or may be an integer multiple of the current CDRX cycle. This is not limited in embodiments of this disclosure. A CDRX cycle parameter may include an ODT, a DIAT, and an LDC. For example, in a first cycle, the ODT is 8 ms, the DIAT is 60 ms, and the LDC is 160 ms.

In addition, the modem traffic information may be one or more of an uplink grant ratio, a downlink grant ratio, an uplink subframe ratio, a downlink subframe ratio, uplink data traffic, or downlink data traffic. The uplink subframe ratio is determined based on an actual quantity of retransmission times of a same uplink grant, and the downlink subframe ratio is determined based on an actual quantity of retransmission times of a same downlink grant. The uplink data traffic is determined based on a quantity of uplink grants and a transport block size (TB S) of each uplink grant, and the downlink data traffic is determined based on a quantity of downlink grants and a transport block size (TBS) of each downlink grant.

Specifically, the uplink grant ratio refers to a ratio of an actual quantity of uplink grants to a theoretical quantity of uplink grants per unit time, and the downlink grant ratio refers to a ratio of an actual quantity of downlink grants to a theoretical quantity of downlink grants per unit time. The uplink subframe ratio refers to a ratio of an actual quantity of uplink subframes to a theoretical quantity of uplink subframes per unit time; and the downlink subframe ratio refers to a ratio of an actual quantity of downlink subframes to a theoretical quantity of downlink subframes per unit time. The uplink data traffic refers to uplink data traffic per unit time, and the downlink data traffic refers to downlink data traffic per unit time. The actual quantity of uplink grants and the actual quantity of downlink grants may be obtained by the user equipment through detection.

The theoretical quantity of uplink grants and the theoretical quantity of downlink grants are related to a type of a communications system, and a quantity of uplink subframes and a quantity of downlink subframes included in a radio frame. For example, as shown in the following Table 1, uplink and downlink subframes whose configuration is 2 is used as an example in an LTE time division duplex (TDD) system. In Table 1, D represents a downlink subframe, S represents a special subframe, and U represents an uplink subframe. Every five subframes include one uplink subframe and four downlink subframes (S may also be used as a downlink subframe). In this case, when a long DRX cycle is 160 ms, a total of 32 uplink subframes and 128 downlink subframes are included in every 160 ms. In other words, a theoretical quantity of uplink grants corresponding to the configuration 2 is 32, and a theoretical quantity of downlink grants corresponding to the configuration 2 is 128. In a frequency division duplex system FDD, each subframe has uplink and downlink. To be specific, every five subframes include five uplink subframes and five downlink subframes. In this case, both a theoretical quantity of uplink grants and a theoretical quantity of downlink grants are 5.

TABLE 1

| Config-uration | Period for switching between uplink and downlink | Subframe sequence number | | | | | | | | | |
|---|---|---|---|---|---|---|---|---|---|---|---|
| | | 0 | 1 | 2 | 3 | 4 | 5 | 6 | 7 | 8 | 9 |
| 2 | 5 ms | D | S | U | D | D | D | S | U | D | D |

The uplink subframe ratio is determined based on an actual quantity of retransmission times of a same uplink grant, and refers to a quantity of subframes that include Hybrid Automatic Repeat Request (HARQ) retransmission in the quantity of uplink subframes. Therefore, the uplink subframe ratio may be greater than the uplink grant ratio. The uplink data traffic is a product of a quantity of uplink subframes in an uplink grant and a transport block size (TBS) of each uplink subframe. The transport block size (TBS) is determined by a quantity of resource blocks (RBs) used for transmission and a size of each RB.

It should be noted that calculation of the downlink subframe ratio is similar to calculation of the uplink subframe ratio, and calculation of the downlink data traffic is similar to calculation of the uplink data traffic. For details, refer to the foregoing description.

S402. When the modem traffic information meets a preset condition, the baseband processor sends indication information to the base station, where the indication information is used to instruct the base station to adjust a CDRX cycle of the user equipment.

A parameter in the CDRX cycle may include the ODT, the DIAT, and the LDC. The indication information is used to instruct the base station to adjust the CDRX cycle of the user equipment. Specifically, the indication information is used to instruct the base station to adjust an adjustment direction of the parameter in the CDRX cycle, for example, instruct the base station to increase a parameter in the CDRX cycle, or reduce a parameter. Alternatively, the indication information is used to instruct the base station to adjust one or more parameters in the CDRX cycle to a specific value.

In addition, when the modem traffic information meets different preset conditions, adjustment performed by the base station on the CDRX cycle of the user equipment that is indicated by the indication information sent by the baseband processor to the base station is also different. The following describes in detail based on the different preset conditions.

In a first embodiment, the modem traffic information includes the downlink grant ratio, the downlink subframe ratio, or the downlink data traffic, and the modem traffic information meets a first preset condition, for example, the modem traffic information is less than a first threshold.

That the modem traffic information is less than the first threshold may specifically refer to that the downlink grant ratio, the downlink subframe ratio, or the downlink data traffic is less than a first threshold corresponding to respective parameter. The first threshold corresponding to each parameter may be preset, or may be configured by using higher layer signaling. Optionally, when the modem traffic information includes the downlink grant ratio, a first threshold corresponding to the downlink grant ratio may be set to different values based on an actual situation. For example, when the theoretical quantity of downlink grants is 128 and the first threshold is 0.05, 128×0.05=6, and when the actual quantity of downlink grants detected by the baseband processor is less than 6, the modem traffic information meets the first preset condition. In other words, it may be determined that data of the user equipment is sparsely transmitted. For another example, when the modem traffic information includes the downlink data traffic, a first threshold corresponding to the downlink data traffic may be 10 Mbps. When it is detected that the downlink data traffic per unit time is less than 10 Mbps, the modem traffic information meets the first preset condition.

In addition, when the modem traffic information includes the downlink grant ratio, if the downlink grant ratio detected by the baseband processor is less than the first threshold corresponding to the downlink grant ratio, it is determined that the modem traffic information meets the first preset condition. If the downlink grant ratio detected by the baseband processor is greater than or equal to the first threshold corresponding to the downlink grant ratio, it is determined that the modem traffic information does not meet the first preset condition. It should be noted that a method for determining, by the baseband processor based on the downlink subframe ratio or the downlink data traffic, whether the modem traffic information meets the first preset condition is consistent with a method for determining, based on the downlink grant ratio, whether the modem traffic information meets the first preset condition, and a first threshold corresponding to each of the downlink subframe ratio and downlink data traffic may be different from the first threshold corresponding to the downlink grant ratio.

Specifically, when the modem traffic information meets the first preset condition, the baseband processor may send first indication information to the base station, where the first indication information may be used to instruct the base station to adjust an adjustment direction of the parameter in the CDRX cycle, or the first indication information may be used to instruct the base station to adjust the parameter in the CDRX cycle to a specific value. An adjustment purpose is to reduce power consumption of the user equipment, for example, to reduce wake-up time of the user equipment. By adjusting the CDRX cycle of the user equipment by using the method, power consumption of the user equipment can be reduced, and power consumption can be reduced.

That the first indication information may be used to instruct the base station to adjust the adjustment direction of the parameter in the CDRX cycle may specifically include: The first indication information is used to instruct the base station to increase the LDC in the CDRX cycle of the user equipment. In addition, when the long DRX cycle in the CDRX cycle is increased, the first indication information may further be used to instruct the base station to increase or decrease the ODT and/or increase or decrease the DIAT. The baseband processor may instruct, by using the first indication information, the base station to adjust one parameter in the CDRX cycle, or may instruct the base station to adjust a plurality of parameters in the CDRX cycle.

That the first indication information may be used to instruct the base station to adjust the parameter in the CDRX cycle to a specific value may specifically include: The first indication information is used to instruct the base station to adjust the CDRX cycle to the first cycle, where an LDC in the first cycle is greater than an LDC in the current CDRX cycle. For example, the first indication information is used to instruct the base station to increase the LDC to X1 ms. In addition, the first cycle indicated by the first indication information may further include information about the ODT and/or the DIAT, and the ODT in the first cycle may be greater than or less than the ODT in the current CDRX cycle, and/or the DIAT in the first cycle may be greater than or less than the DIAT in the first cycle. In this case, after the baseband processor determines that the modem traffic information meets the first preset condition, the baseband processor may further determine a specific value of one or more parameters in the first cycle based on the modem traffic information, so as to send the specific value of the determined parameter to the base station by using the first indication information.

Optionally, when the CDRX of the user equipment further includes a short DRX cycle (SDC), for example, the CDRX of the user equipment includes the LDC and the SDC, and the user equipment switches between the LDC and the SDC to perform discontinuous reception, the first indication information may be further used to instruct the base station to disable the SDC in the CDRX of the user equipment, so that the user equipment performs connected discontinuous reception based on the LDC. In this way, power consumption of the user equipment can be further reduced.

Further, the user equipment may further meet the following conditions: there is no dedicated bearer on the user equipment, channel quality of the user equipment is greater than a specified threshold, the user equipment is in a screen-off state, and there is no Internet (Over The Top, OTT) call on the user equipment. To be specific, when the modem traffic information of the user equipment is less than the first threshold, and the user equipment meets all the conditions that there is no dedicated bearer, channel quality is greater than a specified threshold, the user equipment is in a screen-off state, and there is no OTT call, the user equipment sends the first indication information to the base station. In this way, it can be more accurately determined that the current user equipment is in an idle mode, so that accuracy of CDRX cycle adjustment is improved when the CDRX cycle is adjusted, thereby further reducing power consumption of the user equipment.

The channel quality of the user equipment may be indicated by one or more parameters of reference signal received power (RSRP), reference signal received quality (RSRQ), signal-to-noise ratio (SNR), and signal to interference plus noise ratio (SINR). Each parameter may correspond to a specified threshold, and the specified threshold may be set in advance. For example, when the user equipment simultaneously meets conditions that RSRP meets RSRP>−110 dB, RSRQ meets RSRQ>−3 dB, SNR meets SNR>−1 dB, and SINR meets SINR>−1 dB, it is determined that the user equipment meets the condition that the channel quality is greater than the specified threshold.

In a second embodiment, the modem traffic information includes the uplink grant ratio, the uplink subframe ratio, or the uplink data traffic, and the modem traffic information meets a second preset condition, for example, the modem traffic information is greater than a second threshold.

That the modem traffic information is greater than the second threshold may specifically refer to that the uplink grant ratio, the uplink subframe ratio, or the uplink data traffic that is included in the modem traffic information is greater than a second threshold corresponding to respective parameter. The second threshold corresponding to each parameter may be preset, or may be configured by using higher layer signaling. Optionally, when the modem traffic information includes the uplink grant ratio, a second threshold corresponding to the uplink grant ratio may be set to different values based on an actual situation. For example, when the theoretical quantity of downlink grants is 32 and the second threshold corresponding to the uplink grant ratio is 0.06, 32×0.06≈2, and when the actual quantity of uplink grants detected by the baseband processor is greater than 2, it is determined that the modem traffic information meets the second preset condition, for example, it may be determined that data of the user equipment is not sparsely transmitted.

In addition, when the modem traffic information includes the uplink grant ratio, if the uplink grant ratio detected by the baseband processor is greater than the second threshold corresponding to the uplink grant ratio, it is determined that the modem traffic information meets the second preset condition. If the uplink grant ratio detected by the baseband processor is less than or equal to the second threshold corresponding to the uplink grant ratio, it is determined that the modem traffic information does not meet the second preset condition. It should be noted that a method for determining, by the baseband processor based on the uplink subframe ratio or the uplink data traffic, whether the modem traffic information meets the second preset condition is consistent with a method for determining, based on the uplink grant ratio, whether the modem traffic information meets the second preset condition, and a second threshold corresponding to each of the uplink subframe ratio and uplink data traffic may be different from the second threshold corresponding to the uplink grant ratio.

Specifically, when the modem traffic information meets the second preset condition, the baseband processor may send second indication information to the base station, where the second indication information may be used to instruct the base station to adjust an adjustment direction of the parameter in the CDRX cycle, or the second indication information may be used to instruct the base station to adjust the parameter in the CDRX cycle to a specific value. An adjustment purpose is to increase wake-up time of the user equipment.

That the second indication information may be used to instruct the base station to adjust the adjustment direction of the parameter in the CDRX cycle may specifically include: The first indication information is used to instruct the base station to reduce the LDC in the CDRX cycle. In addition, when the LDC in the CDRX cycle is reduced, the second indication information may further be used to instruct the base station to increase or decrease the ODT and/or increase or decrease the DIAT. The user equipment may instruct, by using the second indication information, the base station to adjust one parameter in the CDRX cycle, or may instruct the base station to adjust a plurality of parameters in the CDRX cycle. In this way, a time at which the user equipment is in the wake-up state may be increased, thereby ensuring that the user equipment has relatively good communication performance when the modem traffic information is relatively large.

That the second indication information may be used to instruct the base station to adjust the parameter in the CDRX cycle to a specific value may specifically include: The second indication information is used to instruct the base station to adjust the CDRX cycle to a second cycle, where an LDC in the second cycle is less than an LDC in the current CDRX cycle of the user equipment. For example, the second indication information is used to instruct the base station to increase the LDC to X2 ms. In addition, the second cycle indicated by the second indication information may further include information about the ODT and/or the DIAT, and the ODT in the second cycle may be greater than or less than the ODT in the current CDRX cycle, and/or the DIAT in the second cycle may be greater than or less than the DIAT in the current CDRX cycle. In this case, after the baseband processor determines that the modem traffic information meets the second preset condition, the baseband processor may further determine a specific value of one or more parameters in the second cycle based on the modem traffic information, so as to send the specific value of the determined parameter to the base station by using the second indication information.

Optionally, when the second indication information is used to instruct the base station to adjust the cycle of the CDRX to the second cycle, the second cycle may be a default CDRX cycle. Parameters in the default CDRX cycle are fixed, and may be configured by the base station. For example, an LDC in the default CDRX cycle is 160 ms, an ODT is 8 ms, and a DIAT is 60 ms. When the modem traffic information of the user equipment meets the second preset condition, the second indication information sent by the baseband processor to the base station may be used to instruct the base station to adjust the cycle of the CDRX of the user equipment to the default CDRX cycle. The default CDRX cycle is a relatively preferred CDRX cycle configured by the base station. In this way, not only better communication performance of the user equipment can be ensured, but also no additional power consumption is brought to the user equipment, thereby improving user experience.

Further, the user equipment may further send the second indication information to the base station when at least one condition in the following information is met. The at least one condition includes: there is a dedicated bearer on the user equipment, channel quality of the user equipment is less than or equal to a specified threshold, the user equipment is in a screen-on state, and there is an OTT call on the user equipment. To be specific, when there are one or more conditions in which the user equipment has a dedicated bearer, the channel quality is less than or equal to the specified threshold, the user equipment is in a screen-on state, and there is an OTT call, the user equipment sends the second indication information to the base station. In this way, it can be more accurately determined that the current user equipment is in a busy state. Therefore, when the CDRX cycle is adjusted, accuracy of adjusting the CDRX cycle is improved, thereby ensuring that the user equipment has better communication performance, and improving user experience.

Figure 5:
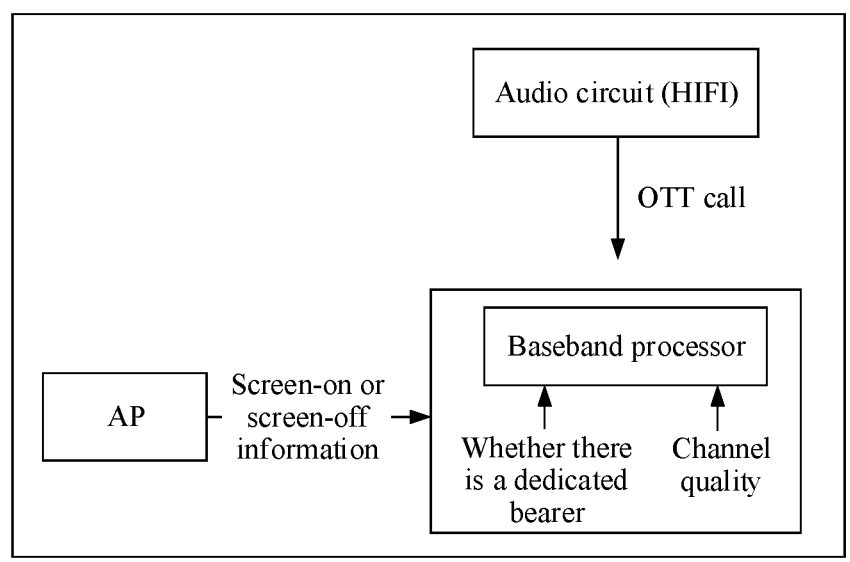
FIG. 5 is a schematic diagram of information interaction in user equipment according to an embodiment of this application.

Specifically, as shown in FIG. 5, whether there is a dedicated bearer on the user equipment and whether channel quality of the user equipment is greater than a specified threshold may be detected by the baseband processor in the user equipment. For a specific detection method, refer to descriptions in a related technology. That the user equipment is in a screen-on state or the user equipment is in a screen-off state may be detected by the AP of the user equipment, and indicated to the baseband processor. Whether there is an OTT call on the user equipment may be indicated by the AP or an audio circuit (for example, HIFI) to the baseband processor. The AP notifies the audio circuit of information about enabling and disabling the OTT call, so that the audio circuit performs a corresponding voice enhancement function. In addition, the audio circuit may also determine, based on whether voice input is detected and whether an output device is enabled, whether there is an OTT call.

S403. When the base station receives the indication information, the base station determines the first cycle for the user equipment based on the indication information.

The base station receives the indication information sent by the user equipment, where the indication information is used to instruct the base station to adjust the CDRX cycle of the user equipment, so that the base station may determine the first cycle based on the indication information. Specifically, when the modem traffic obtained by the baseband processor meets different preset conditions, the indication information sent by the baseband processor to the base station indicates that adjustments performed by the base station on the CDRX cycle of the user equipment may be different, and therefore, operations for determining the first cycle by the base station based on the indication information are also different. The following separately describes the operations.

In a first embodiment, the modem traffic information includes the downlink grant ratio, the downlink subframe ratio, or the downlink data traffic, and the modem traffic information meets a first preset condition, for example, the modem traffic information is less than a first threshold. The first embodiment in S403 corresponds to the first embodiment in S402.

Correspondingly, that the base station receives the indication information sent by the user equipment specifically includes: The base station receives the first indication information sent by the user equipment. The first indication information may be used to instruct the base station to increase an LDC in the CDRX cycle. When the first indication information is used to instruct the base station to increase the LDC in the CDRX cycle, when determining the first cycle, the base station may adjust the LDC in the CDRX cycle, and do not adjust a parameter that is not indicated by the first indication information. For example, if the first indication information is used to instruct the base station to increase the LDC in the CDRX cycle, the base station may directly increase the LDC to a target value, and does not adjust the ODT and the DIAT. The base station may also adjust the parameter that is not indicated by the first indication information, and a specific adjustment is determined by the base station. This is not limited in embodiments of this disclosure.

Alternatively, the first indication information is used to instruct the base station to adjust the CDRX cycle to the first cycle, where the LDC in the first cycle is greater than the LDC in the current CDRX cycle. In this case, the first indication information indicates a specific value of the LDC in the first cycle, and the base station may adjust the LDC based on the specific value indicated by the first indication information, so that a value of the adjusted LDC in the first cycle is consistent with the specific value indicated by the first indication information. Similarly, when the first indication information indicates one or more parameters in the CDRX cycle, the base station may correspondingly adjust the indicated parameters, and may not adjust other parameters that are not indicated. Certainly, the base station may also adjust the parameter that is not indicated by the first indication information, and a specific adjustment is determined by the base station. This is not limited in embodiments of this disclosure.

In a second embodiment, the modem traffic information includes the uplink grant ratio, the uplink subframe ratio, or the uplink data traffic, and the modem traffic information meets the second preset condition, for example, the modem traffic information is greater than the second threshold. The second embodiment in S403 corresponds to the second embodiment in S402.

Correspondingly, that the base station receives the indication information sent by the user equipment includes: The base station receives the second indication information sent by the user equipment. The second indication information may be used to instruct the base station to reduce the LDC in the CDRX cycle. Alternatively, the first indication information is used to instruct the base station to adjust the CDRX cycle to the first cycle, where the LDC in the first cycle is less than the LDC in the current CDRX cycle of the user equipment.

It should be noted that a method for determining the first cycle by the base station based on the second indication information is similar to the method in the foregoing case I. For details, refer to the foregoing description in the foregoing case I.

Further, when the second indication information may be further used to instruct the base station to adjust the CDRX cycle of the user equipment to the default CDRX cycle, a specific value of the parameter in the CDRX cycle indicated in the second indication information may be a specific value of the parameter in the default CDRX cycle. In this case, the base station may determine the default CDRX cycle as the first cycle.

Further, in S402, when the user equipment determines that the modem traffic information meets the preset condition, the baseband processor may determine a new CDRX cycle for the user equipment based on the modem traffic information, and send, to the base station by using the indication information, index information corresponding to the determined new CDRX cycle. A correspondence between the cycle and the index information may be preset. Correspondingly, when the base station receives the indication information, the base station may determine, based on the index information in the indication information, a corresponding new CDRX cycle from the preset correspondence between the cycle and the index information, where the new CDRX cycle may be the first cycle. Interaction information between the user equipment and the base station may be saved by using index information.

S404. The base station sends first configuration information to the user equipment, where the first configuration information includes CDRX information of the user equipment.

S405. The baseband processor receives the first configuration information sent by the base station, and configures the CDRX cycle of the user equipment by using the first configuration information.

The CDRX information of the user equipment included in the first configuration information may be information about the first cycle determined by the base station. After the base station determines the first cycle, the base station may send the information about the first cycle to the baseband processor of the user equipment by using the first configuration information. Optionally, the first configuration information may be an RRC reconfiguration message, and the base station may send a specific value of each parameter in the first cycle to the user equipment by using the RRC reconfiguration message. After the baseband processor receives the first configuration information, the baseband processor may configure the CDRX cycle of the user equipment by using the first configuration information. Therefore, after the current CDRX cycle of the user equipment ends, the user equipment and the base station may run synchronously based on the first cycle. To be specific, the base station may send data in the ODT and the DIAT of the first cycle. In this case, the user equipment may correspondingly receive the data sent by the base station.

In this embodiment of this application, the baseband processor of the user equipment obtains the modem traffic information, and when the modem traffic information meets the preset condition, the baseband processor of the user equipment sends, to the base station, the indication information that is used to instruct the base station to adjust the CDRX, so that the base station determines the first cycle based on the indication information, and configures the CDRX of the user equipment as the first cycle based on the first configuration information, so that the base station implements the adjustment of the CDRX of the user equipment based on the modem traffic information, thereby ensuring communication performance of the user equipment and reducing power consumption of the user equipment.

Figure 6:
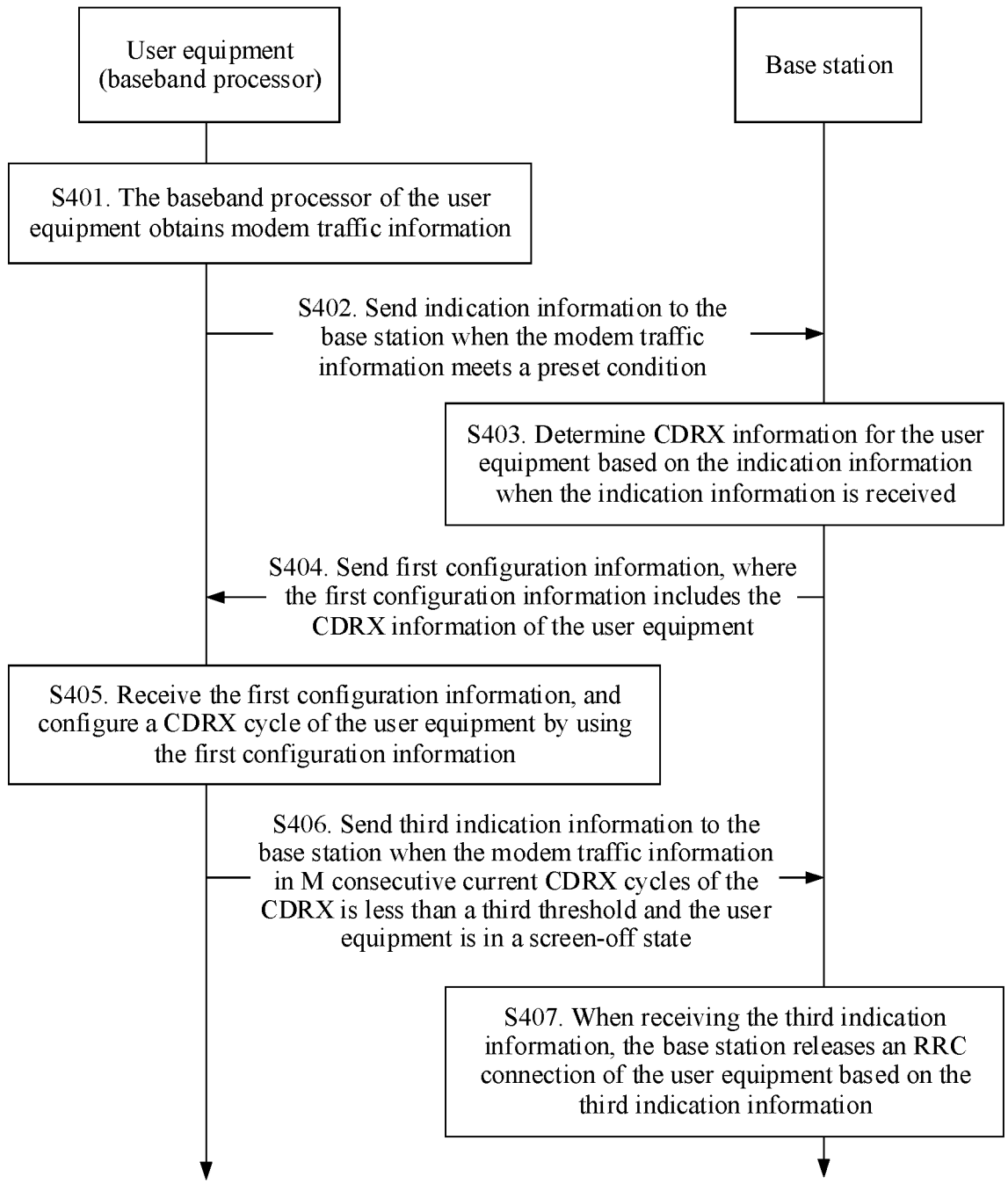
FIG. 6 is a schematic flowchart of another power consumption control method according to an embodiment of this application.

Further, referring to FIG. 6, after S401, the method may further include S406 and S407. S406 and S407 and S402 to S405 are not in a sequence, and a condition on which the user equipment meets is that a step corresponding to the condition is performed.

S406. The user equipment sends third indication information to the base station when modem traffic information of the user equipment in M consecutive current CDRX cycles of the user equipment is less than a third threshold, and the user equipment is in a screen-off state, where the third indication information is used to instruct the base station to release an RRC connection of the user equipment, and M is a positive integer.

S407. When the base station receives the third indication information sent by the user equipment, the base station releases the RRC connection of the user equipment based on the third indication information.

The third threshold may be preset, and the third threshold may be close to zero. When the modem traffic information of the user equipment in M consecutive current CDRX cycles is less than the third threshold, and the user equipment is in a screen-off state, it indicates that data transmitted by the user equipment in a specific time is small or basically no data is transmitted. Therefore, the baseband processor may send, to the base station, the third indication information used to instruct the base station to release the RRC connection. When receiving the third indication information, the base station may release the RRC connection of the user equipment, so as to adjust the user equipment from a connected mode to an idle mode, thereby reducing power consumption of the user equipment.

Optionally, when the user equipment has no uplink data to be sent and the modem traffic information in consecutive N current CDRX cycles of the user equipment is less than a fourth threshold (the fourth threshold may be preset, and the fourth threshold may be close to zero), the baseband processor may send fourth indication information to the base station, where the fourth indication information is used to indicate, to the base station, that the user equipment enters idle DRX (Idle DRX means that the user equipment is in an idle mode and has no the RRC connection). When the base station receives the fourth indication information, the base station may determine uplink and downlink buffers of the user equipment. When the uplink and downlink buffers are empty, the base station sends an instruction to the user equipment, so that the user equipment enters the idle DRX. When the uplink and downlink buffers are not empty, the base station does not process a message of the UE in the ODT and the DIAT in the CDRX cycle. In this way, power consumption of the user equipment can be reduced, power consumption can be reduced, and power usage time of the user equipment can be increased.

Figure 7:
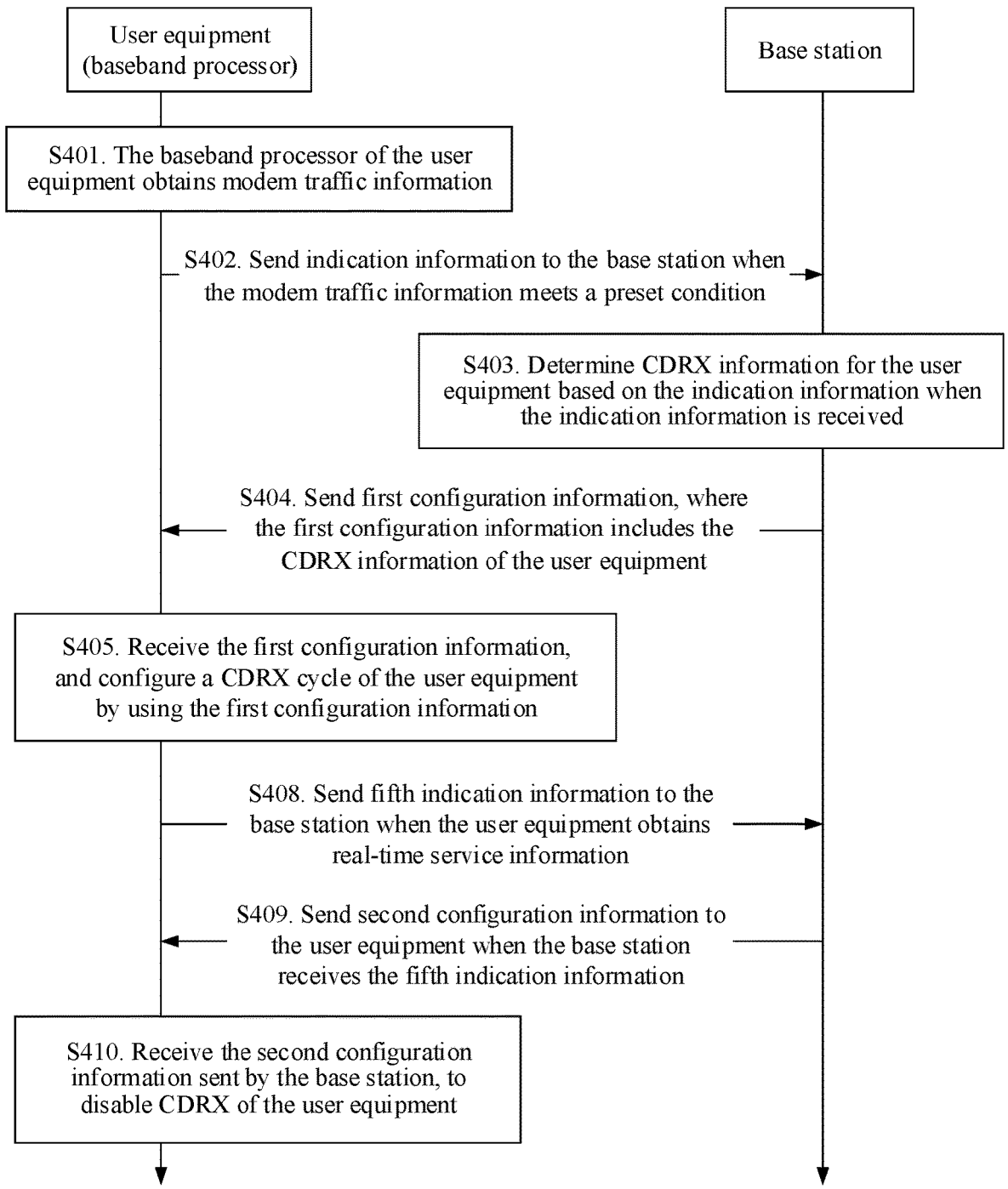
FIG. 7 is a schematic flowchart of still another power consumption control method according to an embodiment of this application.

Further, referring to FIG. 7, after S401, the method may further include S408 to S410. S408 to S410 and S402 to S405 are not in a sequence, and a condition on which the user equipment meets is that a step corresponding to the condition is performed.

S408. When the baseband processor obtains real-time service information, the baseband processor sends fifth indication information to the base station, where the fifth indication information is used to instruct the base station to disable the CDRX of the user equipment.

The real-time service information refers to that when the AP of the user equipment detects that there is a real-time service in a current service of the user equipment, such as a real-time game, ticket snatching, or a red envelope snatching service, the AP may send a notification message to the baseband processor, so as to notify the baseband processor that there is a current real-time service, so that the baseband processor may send, to the base station, the fifth indication information used to instruct the base station to disable the CDRX of the user equipment.

S409. The base station sends second configuration information to the user equipment when the base station receives the fifth indication information, where the second configuration information is used to disable the CDRX of the user equipment.

S410. The baseband processor receives the second configuration information sent by the base station, to disable the CDRX of the user equipment.

Because there is the real-time service in the service of the user equipment, to not affect normal running of the real-time service, when receiving the fifth indication information, the base station may send, to the user equipment, the second configuration information used to disable the CDRX of the user equipment, so as to disable the CDRX of the user equipment, even if the ODT in the CDRX parameter is the same as the LDC. In this way, the user equipment is always awake and receives data, so that an ultra-low latency of the real-time service is implemented, and communication performance and user experience of the user equipment are improved.

Figure 8:
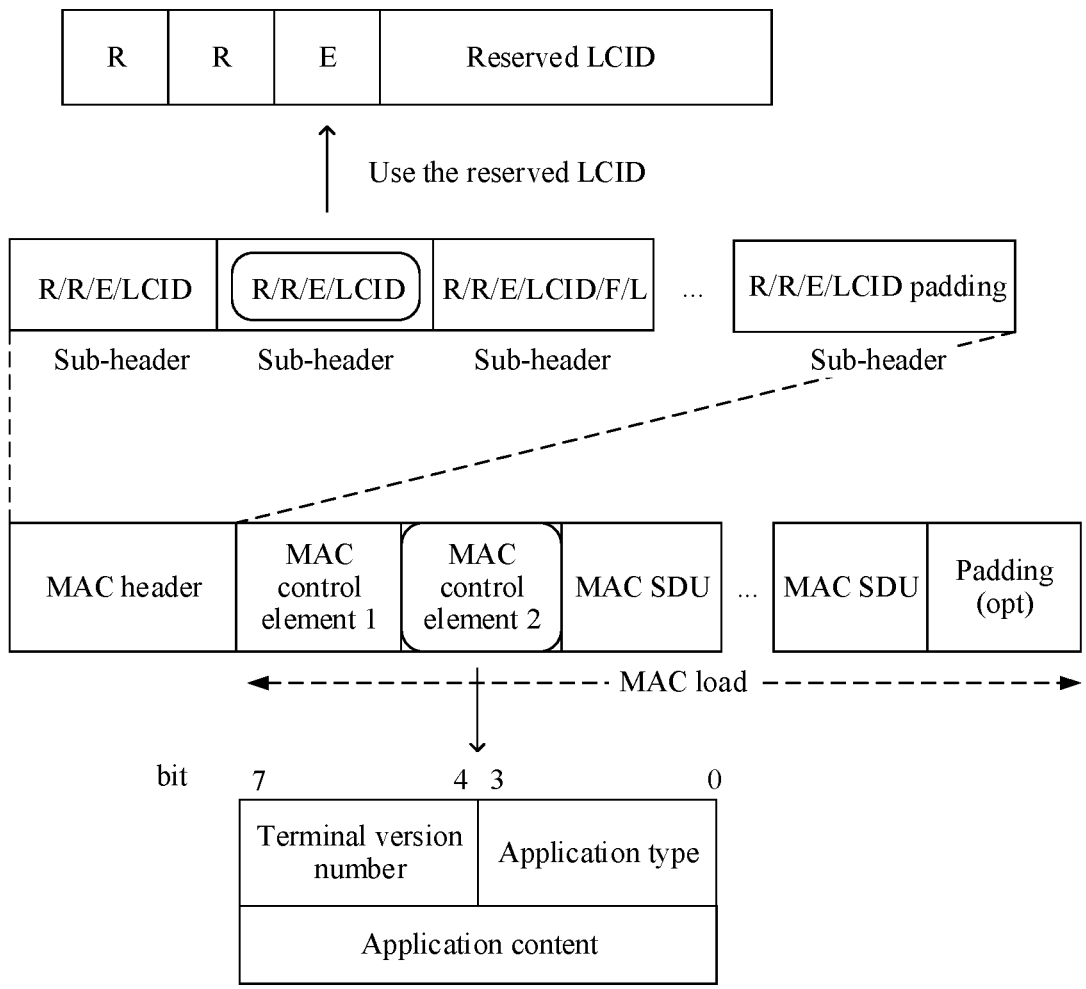
FIG. 8 is a schematic diagram of a signaling format of a CDRX request according to an embodiment of this application.

Further, when the baseband processor sends the first indication information, the second indication information, the third indication information, the third indication information, or the fifth indication information to the base station, the baseband processor may send the indication information by using a CDRX request. FIG. 8 is a signaling format of a CDRX request, and the user equipment may send the indication information by using a reserved LCID. In the signaling format, a MAC header is R/R/E/LCID, and a MAC load part is a MAC control element 2. The MAC control element 2 is a fixed 2-byte, 0 to 3 bits are an application type, 4 to 7 bits are a terminal version number, an index of an LCID corresponding to the DL-SCH is 01011 to 11010, and an index of an LCID corresponding to the UL-SCH is 01011 to 11000.

The following Table 2 shows a specific description of the application type. A request information type (Request Message Type) is a CDRX request, and an index corresponding to the request information type is 0001. A possible request sub-type includes: a CDRX change, a DRX in-activity timer request, and fast dormancy. A response information type (Response Message Type) is a CDRX response, and a possible response sub-type includes: accept, deny, RRC configuration, a CDRX MAC-CE command, RRC connection release, and a comment.

TABLE 2

| Index | Request information type | Possible request subtype | Response information type | Possible response subtype | Comment |
|---|---|---|---|---|---|
| 0001 | CDRX request | CDRX change, DRX inactive timer request, and fast dormancy | CDRX response | Accept, deny, RRC configuration, CDRX MAC-CE command, RRC connection release | For different set CDRX change protocols, fast dormancy may be an option |

As shown in Table 3 below, when the request information type is the CDRX request (the index is 0001), a specific description of a CDRX request body is shown below. Table 3 includes: a fast RRC release request, a disable CDRX request, an enable CDRX request, and a default CDRX cycle request.

TABLE 3

| CDRX request body | Description | | | |
|---|---|---|---|---|
| 0000 0000 | Fast RRC release request | | | |
| | ODT | DIAT | DRT | LDC |
| 0000 0011 | psf10 | psf10 | psf4 | sf640 (turn up 1) |
| 0000 0100 | psf10 | psf10 | psf4 | sf1280 (turn up 2) |
| 0000 1101 | Disable CDRX request | | | |
| 0000 1110 | Enable CDRX request | | | |
| 1111 1110 | Default CDRX cycle request | | | |
| Others | Reserved | | | |

In the foregoing Table 3, DRT meets DRT=DRX retransmission timer. Correspondingly, a format of the MAC CE may be shown in (a) in FIG. 9. For example, two gears may be set to turn up the CDRX cycle (turn up 1 and turn up 2), and corresponding long DRX cycles of the CDRX may be respectively 640 ms and 1,280 ms. The selection is mainly based on that the CDRX long DRX cycle is considered to be smaller than a tracking area (TA) of the user equipment as much as possible. For example, if TA is 1 s, the CDRX long DRX cycle cannot be set to 1,280 ms. If the TA is 1s, and the long DRX cycle of the CDRX is set to 1,280 ms, the TA expires after each LDC wakes up. This is not conducive to power saving.

Figure 9:
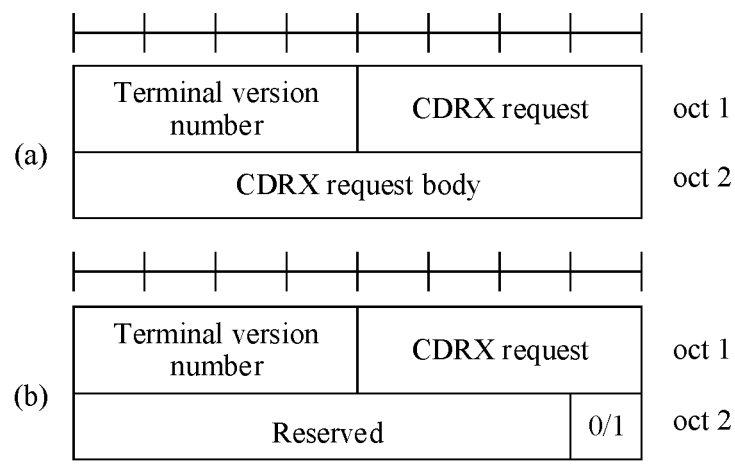
FIG. 9 is a schematic diagram of another signaling format of a CDRX request according to an embodiment of this application.

Correspondingly, as shown in (b) in FIG. 9, the base station on a network side may send a response message by using a same request information type, and use a lowest bit of the request body to carry an agreed or denied identifier. 0 may represent denied, and 1 may represent agreed.

Figure 10:
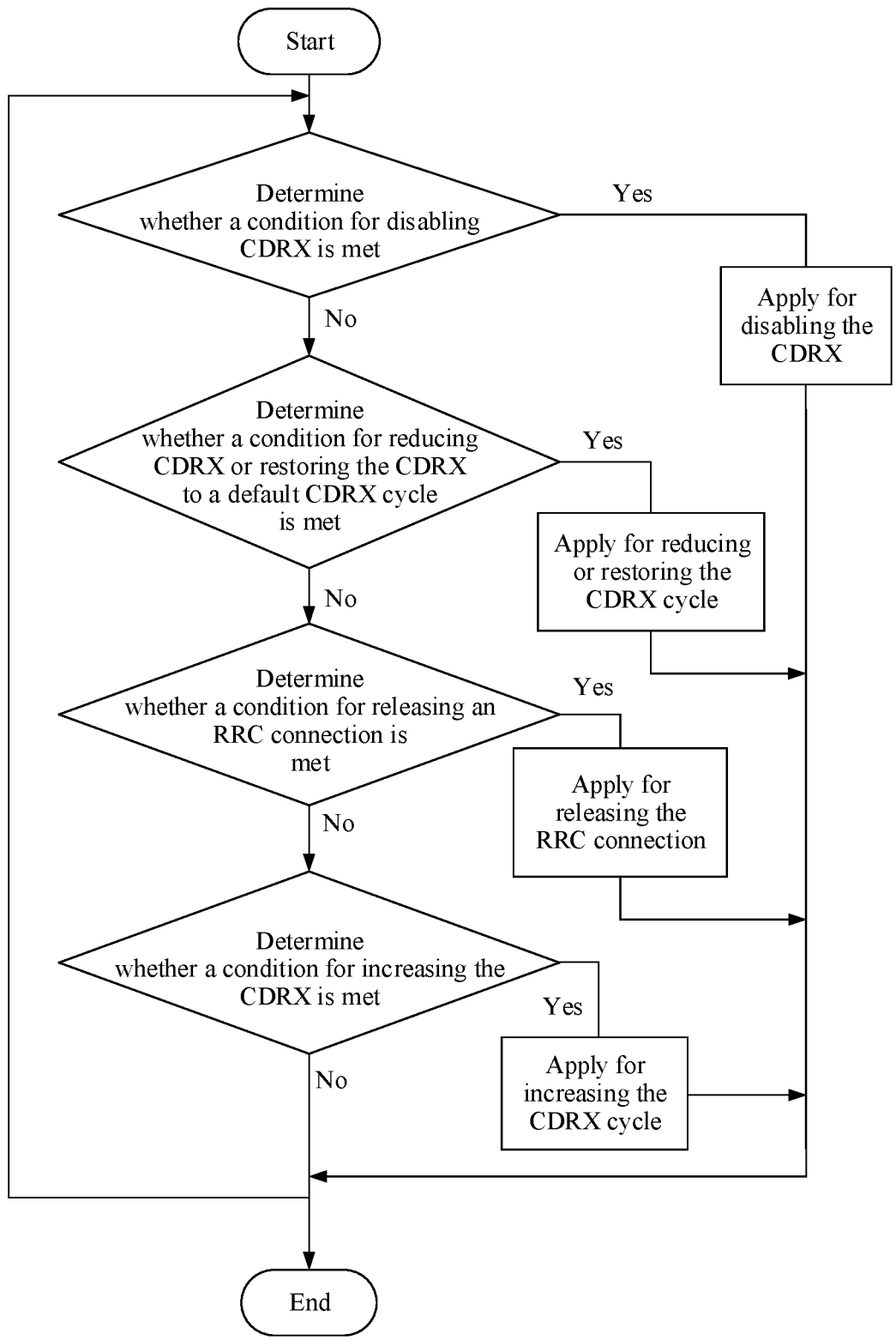
FIG. 10 is a schematic flowchart of another power consumption control method according to an embodiment of this application.

Further, when the user equipment determines, based on the modem traffic information, that the modem traffic information meets a specified preset condition, and sends corresponding indication information to the base station, the user equipment may perform determining based on a sequence shown in FIG. 10. First, the user equipment determines whether the modem traffic information meets a condition for disabling the CDRX. If the modem traffic information meets the condition for disabling the CDRX (yes), the user equipment applies for disabling the CDRX (e.g., the user equipment sends the fifth indication information to the base station); or if the modem traffic information does not meet the condition for disabling the CDRX (no), the user equipment determines whether the modem traffic information meets a condition for reducing the CDRX or restoring the CDRX to the default CDRX cycle (e.g., whether the modem traffic information meets the second preset condition). If the modem traffic information meets the condition for reducing the CDRX or restoring the CDRX to the default CDRX cycle (yes), the user equipment applies for reducing or restoring the CDRX cycle (e.g., the user equipment sends the second indication information to the base station); or if the modem traffic information does not meet the condition for reducing the CDRX or restoring the CDRX to the default CDRX cycle (no), the user equipment determines whether the modem traffic information meets a condition for releasing the RRC connection. If the modem traffic information meets the condition for releasing the RRC connection (yes), the user equipment applies for releasing the RRC connection (e.g., the user equipment sends the third indication information to the base station); or if the modem traffic information does not meet the condition for releasing the RRC connection (no), the user equipment determines whether the modem traffic information meets a condition for increasing the CDRX. If the modem traffic information meets the condition for increasing the CDRX (yes), the user equipment applies for increasing the CDRX (e.g., the user equipment sends the first indication information to the base station); or if the modem traffic information does not meet the condition for increasing the CDRX (no), the determining ends.

For example, when the baseband processor in the user equipment sends, to the base station, indication information used to adjust the CDRX cycle, one field may be used in the indication information to represent one independent parameter, and then a plurality of fields are used to respectively correspond to a plurality of parameters, for example, 8 bits include 1 bit indicating ODT, 1 bit indicating DIAT, 2 bits indicating LDC, 1 bit indicating whether to carry SDC, 1 bit indicating whether to release RRC, and 2 bits reservation. A specific definition of each field may be as follows:

Bit 0 indicates the ODT. When bit 0 is set to 1, it indicates 10 psf. When bit 0 is set to 0, it indicates that a default value is restored.

Bit 1 indicates the DIAT. When bit 1 is set to 1, it indicates 10 psf. When bit 1 is set to 0, it may indicate that a default value is restored.

Bits 2-3 indicate the LDC. When bits 2-3 are set to 01, it indicates 640 psf. When bits 2-3 are set to 10, it may indicate 1,280 psf. When bits 2-3 are set to 00, it may indicate that a default value is restored. When bits 2-3 are set to 11, it may indicate reservation (represented by XX).

Bit 4 indicates whether to carry the SDC. When bit 4 is set to 1, it indicates that the SDC is not carried. When bit 4 is set to 0, it indicates that the default value is restored.

Bit 5 indicates whether to release the RRC connection. When bit 5 is set to 1, it indicates that the RRC connection is released. When bit 5 is set to 0, it indicates that the RRC connection is not released.

Bits 6-7 indicate reservation (represented by XX).

For example, when the indication information sent by the user equipment to the base station is used to instruct to increase the CDRX, bit 7-bit 0 may be specifically X X 0 1 1 0 1 1. When the indication information sent by the user equipment to the base station is used to instruct to restore the CDRX cycle, bit 7-bit 0 may be specifically X X 0 0 0 0 0 0. When the indication information sent by the user equipment to the base station is used to instruct to release the RRC connection, bit 7-bit 0 may be specifically X X 1 X X X X X.

It should be noted that a quantity of bits included in each field and an indication/meaning corresponding to different positions are merely examples, and do not constitute any limitation on embodiments of this application. In actual application, indication/meanings corresponding to different bits and different positions may also be different. This is not limited in embodiments of this disclosure.

In an actual data test, an example, in which the user equipment is a mobile phone, and different service types run on the mobile phone, is used for description. The service types run on the mobile phone may include WeChat call voice, QQ call voice, WeChat call mute, QQ call mute, and standby. The following Table 4 shows data obtained by measuring different service types in different settings. A direction in Table 4 includes an uplink (UL) and a downlink (DL), a unit of a quantity of IP packets is one/per second, a unit of a size of an IP packet is per byte/one, a unit of duration is a second, a configuration 2 in a TDD system is used as an example of a standard, and a unit of a grant is one/per second.

TABLE 4

| Service type | Direction | Quantity of IP packets | Size of an IP packet | Duration | Standard | Grant | TBS | Grant ratio |
|---|---|---|---|---|---|---|---|---|
| WeChat call voice | UL | 43 | 207 | 90 | TDD configuration 2 | 39 | 1258 | 19.55% |
| QQ call voice | UL | 45 | 316 | 60 | TDD configuration 2 | 39 | 2035 | 19.55% |
| WeChat call mute | UL | 43 | 170 | 60 | TDD configuration 2 | 40 | 1178 | 20.00% |
| QQ call mute | UL | 6 | 136 | 60 | TDD configuration 2 | 20 | 1083 | 10.00% |
| Standby | UL | 3 | 173 | 14 | TDD configuration 2 | 2 | 1816 | 1.00% |
| WeChat call voice | DL | 36 | 171 | 90 | TDD configuration 2 | 53 | 1160 | 6.63% |
| QQ call voice | DL | 21 | 193 | 60 | TDD configuration 2 | 53 | 1049 | 6.63% |
| WeChat call mute | DL | 36 | 171 | 90 | TDD configuration 2 | 53 | 1160 | 6.63% |
| QQ call mute | DL | 21 | 227 | 60 | TDD configuration 2 | 38 | 1743 | 4.75% |
| Standby | DL | 3 | 48 | 14 | TDD configuration 2 | 2 | 837 | 0.5% |

In the foregoing Table 4, there are a total of 270 MAC padding packets of QQ call voice in the UL direction, there are a total of 965 MAC padding packets of QQ call mute in the UL direction, the QQ call voice and QQ call mute in the DL direction depend on whether a peer end is voice or muted, and the RRC connection is released after 14-second standby in the DL direction.

Figure 11:
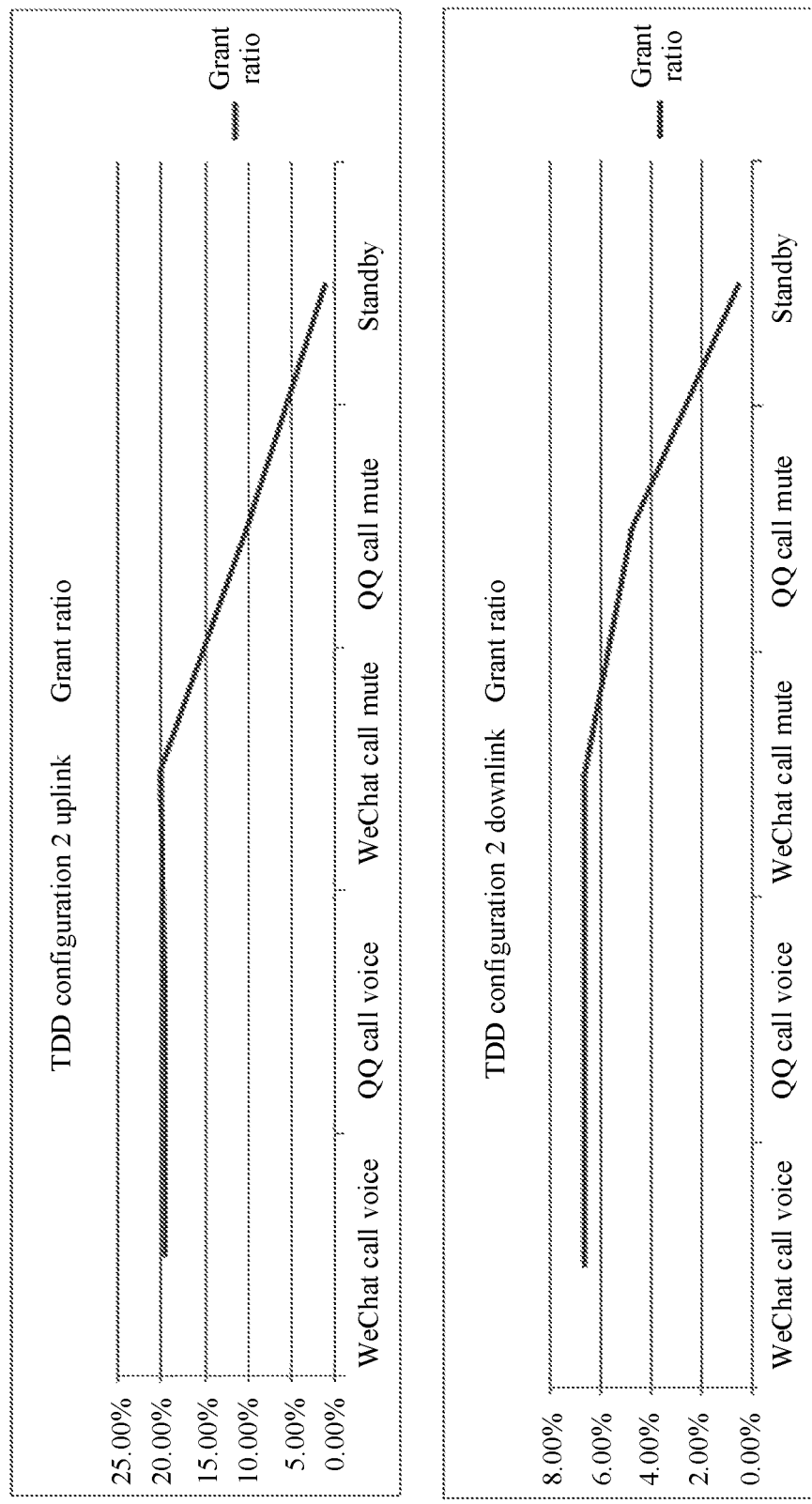
FIG. 11 is a schematic diagram of grant ratios corresponding to different service types measured according to an embodiment of this application.

Based on the data in the foregoing Table 4, the configuration 2 of each service type in the TDD system is obtained, and a corresponding grant ratio is shown in FIG. 11. In the uplink UL direction, when the uplink ratio (for example, the uplink grant ratio) is greater than the first threshold X, it is determined that the data is not sparse, so that the default CDRX cycle is restored during the OTT call in the screen-off state. A value of X herein should be less than the grant ratio 10% during the QQ call mute, for example, the value of X is (10%+1%)/2=5.5% or more. In the downlink DL direction, when the downlink ratio (for example, the downlink grant ratio) is greater than the second threshold Y, it is determined that the data is sparse, so that the long DRX cycle of the CDRX is increased in the screen-off state. A value of Y herein should be greater than the grant ratio 0.5% during the standby, for example, the value of Y is (0.5%+4.75%)/2=2.6% or less.

In the foregoing FIG. 11, a ratio of an uplink MAC packet is detected to distinguish between the OTT voice call and the standby. However, there is uncertainty to distinguish by using the MAC padding packet. As shown in the following Table 5, data is obtained by measuring with reference to whether the user equipment is performing OTT voice call. In Table 5, some test data is listed, and known data includes: a mobile single card (e.g., a network operator is a mobile China, and the user equipment is a single SIM card mobile phone). Power consumption of a modem in an idle mode is 1.74 mA, and power consumption of the modem in an RRC connected mode is 110 mA.

TABLE 5

| Absolute time (s) | Link establishment or release | Potential benefit duration (s) | Idle duration (s) | Link establishment type |
|---|---|---|---|---|
| 46374.617 | RRC link establishment | 22.096 | | MO_DATA |
| 46396.713 | RRC release | | | |
| 46423.268 | RRC link establishment | 5.086 | 26.555 | MT_Access |
| 46428.354 | RRC release | | | |
| 46450.145 | RRC link establishment | 5.158 | 21.791 | MO_DATA |
| 46455.303 | RRC release | | | |
| 46683.843 | RRC link establishment | 5.149 | 228.54 | MO_DATA |
| 46688.992 | RRC release | | | |
| ... | ... | ... | ... | ... |

Completion of a screen-on test
Cumulative potential revenue duration: 132.663 s
Actual revenue duration: 112 s
Judgment duration: 20 s
Cumulative idle duration: 3286.334 s It should be noted that, in Table 5, the single SIM card mobile phone is powered on to establish a PDN connection, QCI=9 default bearer is activated, and an example in which in a CMCC existing network, the CDRX is configured as ODT=8 ms, DIAT=60 ms, and LDC=160 ms, and adjusted CDRX is configured as ODT=8 ms, DIAT=10 ms, and LDC=1,280 ms is used for description. The potential revenue duration is from the RRC link establishment to the RRC.

CMCC existing network working duration A is equal to (ODT+DIAT of the existing network)×adjusted LDC/existing network LDC=(8+60)×1,280/160=544 ms; Working duration after CDRX adjustment B is equal to adjusted (ODT+DIAT)=8+10=18 ms; and adjusted DLC C is equal to 1,280 ms. A revenue per second may be (A−B)/C=(544−18)/1,280=41.1%, and an absolute revenue may be (A−B)/A=(544−18)/544=96.7%.

During a screen-off state for one hour in an actual test, the cumulative potential revenue duration meets $T\_cdrx \approx 132.7$ s, the judgment duration meets Count=20 s, and the cumulative idle duration meets $T\_idle \approx 3286.3$ s, therefore, power before optimization is (132.7−20)×110+3286.3×1.74+1×20×110=21305, corresponding power consumption is 21305/3600=5.92 mA, the power after optimization is (132.7−20)×110/30.2+3286.3×1.74+1×20×110=8361, corresponding power consumption is 8361/3600=2.32 mA, to be specific, 5.92−2.32=3.6 mA of power consumption of the modem is saved per hour during the screen-off, and 3.6/5.92=61% of the power consumption of the modem is optimized, so that normal use time 0.025 days=0.6 hours may be increased.

The foregoing describes the solutions provided in the embodiments of this application mainly from a perspective of interaction between network elements. It may be understood that, to implement the foregoing functions, each network element, for example, the base station or the user equipment, includes corresponding hardware structures and/or software modules for performing the functions. A person of ordinary skill in the art should easily be aware that, in combination with the examples described in the embodiments disclosed in this specification, network elements, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the base station and the user equipment may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that, in this embodiment of this application, module division is an example, and is merely a logical function division. In actual implementation, another division manner may be used.

When functional modules are divided by using corresponding functions, an embodiment of this application shows a possible schematic structural diagram of the baseband processor of the user equipment in the foregoing embodiment. The baseband processor includes a processing unit, a sending unit, and a receiving unit.

The processing unit may be configured to: support the baseband processor in performing a step of configuring the CDRX cycle of the user equipment by using the first configuration information in S401 and S405 in the power consumption control methods provided in FIG. 4, FIG. 6, or FIG. 7, and/or performing another process described in this specification. The sending unit is configured to support the baseband processor in performing S402 in the power consumption control method provided in FIG. 4, FIG. 6, or FIG. 7, S406 in FIG. 6, or S408 in FIG. 7. The receiving unit is configured to support the baseband processor in performing in the step of receiving the first configuration in S405 of the power consumption control method provided in FIG. 4, FIG. 6, or FIG. 7, or S410 in FIG. 7. For specific descriptions, refer to related descriptions in the foregoing embodiments. Details are not described herein again in this embodiment of this application.

In hardware implementation, the processing unit may be a processor, the receiving unit may be a receiver, and the sending unit may be a transmitter. The receiver and the transmitter may form a communications interface.

An embodiment of this application provides a possible schematic logical structure diagram of the user equipment in the foregoing embodiment. The user equipment includes a processor, a communications interface, a memory, and a bus, and the processor, the communications interface, and the memory are connected to each other by using the bus.

The processor is configured to control and manage an action of the user equipment, the communications interface is configured to support communication between the user equipment, and the memory may be further configured to store program code and data of the user equipment. The processor may be a central processing unit, a general-purpose processor, a digital signal processor, a dedicated integrated circuit, a field programmable gate array or another programmable logic device, a transistor logic device, a hardware component, or any combination thereof, and may implement or execute various example logic blocks, modules, and circuits described with reference to the content disclosed in this application. Alternatively, the processor may be a combination of processors implementing a computing function, for example, a combination of one or more microprocessors, or a combination of the digital signal processor and a microprocessor. The bus may be a peripheral component interconnect (PCI) bus, an extended industry standard architecture (EISA) bus, and or the like. The bus may be classified into an address bus, a data bus, a control bus, and the like.

In an embodiment of this application, the processor may include an application processor and a baseband processor, the memory stores a computer program, and the computer program includes an instruction. When the instruction included in the computer program is executed by the user equipment, the baseband processor performs S401, S402, and S405 in the power consumption control method provided in FIG. 4, performs S401, S402, S405, and S406 in the power consumption control method provided in FIG. 6, performs S401, S402, S405, S408, and S410 in the power consumption control method provided in FIG. 7, and/or performs another process described in this embodiment of this application. For specific descriptions, refer to related descriptions in the foregoing embodiments. Details are not described herein again in this embodiment of this application.

In another embodiment of this application, a readable storage medium is further provided. The readable storage medium stores a computer executable instruction. When a device (which may be a single-chip microcomputer or a chip) or a processor performs steps of the user equipment in the power consumption control method provided in FIG. 4, FIG. 6, or FIG. 7. The foregoing readable storage medium may include: any medium that can store program code, such as a removable hard disk, a read-only memory, a random access memory, a magnetic disk, or an optical disc.

In another embodiment of this application, a computer program product is further provided, the computer program product includes a computer executable instruction, and the computer executable instruction is stored in a computer readable storage medium. At least one processor of a device may read the computer executable instruction from the computer readable storage medium, and the at least one processor executes the computer executable instruction, so that the device performs steps of the user equipment in the power consumption control method provided in FIG. 4, FIG. 6, or FIG. 7.

In another embodiment of this application, a communications system is further provided, and the communications system includes a base station and user equipment. The user equipment may be the user equipment provided in any one of the foregoing embodiments, and is configured to perform steps of the user equipment in the power consumption control method shown in FIG. 4, FIG. 6, or FIG. 7.

In this embodiment of this application, the baseband processor of the user equipment obtains the modem traffic information, and when the modem traffic information meets the preset condition, the user equipment sends, to the base station, the indication information used to instruct the base station to adjust the CDRX cycle of the user equipment, so that the base station determines the CDRX cycle based on the indication information, and sends CDRX information of the user equipment to the user equipment by using the first configuration information. The baseband processor of the user equipment configures the CDRX cycle based on the first configuration information, thereby implementing adjustment on the CDRX cycle of the user equipment based on the modem traffic information, thereby reducing power consumption of the user equipment and ensuring communication performance of the user equipment.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A method for power consumption control by user equipment including a baseband processor of a modem, wherein the method comprises:
   detecting, by the baseband processor, modem traffic information that includes information regarding traffic between the modem and a base station;
   determining, by the baseband processor, whether the detected modem traffic information meets a condition;
   sending, by the baseband processor, indication information to the base station in response to the determination that the detected modem traffic information meets the condition, the indication information instructing the base station to adjust a connected discontinuous reception (CDRX) cycle of the user equipment;
   receiving, by the baseband processor, configuration information sent by the base station, the configuration information comprising CDRX information of the user equipment; and
   configuring, by the baseband processor, the CDRX cycle of the user equipment by using the configuration information.

2. The method according to claim 1, wherein the modem traffic information comprises at least one of:
   an uplink grant ratio and/or a downlink grant ratio, an uplink subframe ratio and/or a downlink subframe ratio, or uplink data traffic and/or downlink data traffic, the uplink subframe ratio being determined based on an actual quantity of retransmission times of a same uplink grant, the downlink subframe ratio being determined based on an actual quantity of retransmission times of a same downlink grant, the uplink data traffic being determined based on a quantity of uplink grants and a transport block size (TBS) of each uplink grant, and the downlink data traffic being determined based on a quantity of downlink grants and a TBS of each downlink grant.

3. The method according to claim 1, wherein the modem traffic information comprises a downlink grant ratio, a downlink subframe ratio, and/or a downlink data traffic;
   the indication information instructs the base station to increase a long Discontinuous Reception (DRX) cycle in the CDRX of the user equipment, or instructs the base station to adjust the CDRX of the user equipment to another cycle, a long DRX cycle in the other cycle being greater than a long DRX cycle in the current CDRX cycle of the user equipment; and
   the condition comprises a condition that the modem traffic information is less than a threshold.

4. The method according to claim 3, wherein the CDRX of the user equipment further comprises a short DRX cycle, the indication information further instructs the base station to disable the short DRX cycle in the CDRX of the user equipment.

5. The method according to claim 3, wherein the condition further comprises conditions that: there is no dedicated bearer on the user equipment, channel quality of the user equipment is greater than a quality threshold, the user equipment is in a screen-off state, and there is no Over The Top (OTT) call on the user equipment.

6. The method according to claim 1, wherein the modem traffic information comprises an uplink grant ratio, an uplink subframe ratio, and/or an uplink data traffic;

the indication information instructs the base station to reduce a long Discontinuous Reception (DRX) cycle in the CDRX of the user equipment, or instructs the base station to adjust the CDRX of the user equipment to another cycle, a long DRX cycle in the other cycle being less than a long DRX cycle in the current CDRX cycle; and the condition comprises a condition that the modem traffic information is greater than a threshold.

7. The method according to claim 6, wherein the other cycle is a default CDRX cycle.

8. The method according to claim 6, wherein the condition further comprises at least one of the following conditions:
there is a dedicated bearer on the user equipment, channel quality of the user equipment is less than or equal to a quality threshold, the user equipment is in a screen-on state, or there is an Over The Top (OTT) call on the user equipment.

9. The method according to claim 1, wherein the condition comprises conditions that modem traffic information of the user equipment in M consecutive current CDRX cycles of the user equipment is less than a threshold, and the user equipment is in the screen-off state, M being a positive integer and the indication information instructs the base station to release an Radio Resource Control (RRC) connection of the user equipment.

10. The method according to claim 1, wherein
the condition comprises conditions that the user equipment has no uplink data to be sent and modem traffic information in N consecutive current CDRX cycles of the user equipment is less than a threshold, N being a positive integer, and the indication information indicates, to the base station, that the user equipment enters idle Discontinuous Reception (DRX).

11. The method according to claim 1, wherein the condition comprises a condition that the baseband processor obtains real-time service information, and the indication information instructs the base station to disable the CDRX of the user equipment.

12. User equipment, comprising a baseband processor, and
a memory storing a computer program, wherein the computer program comprises instructions, that when executed by the baseband processor of a modem, enable the baseband processor to perform functions comprising:
detecting modem traffic information that includes information regarding traffic between the modem and a base station;
determining whether the detected modem traffic information meets a condition;
sending indication information to the base station in response to the determination that the detected modem traffic information meets the condition, wherein the indication information instructs the base station to adjust a connected discontinuous reception (CDRX) cycle of the user equipment;
receiving configuration information sent by the base station, wherein the configuration information comprises CDRX information of the user equipment; and
configuring the CDRX cycle of the user equipment by using the configuration information.

13. The user equipment according to claim 12, wherein the modem traffic information comprises at least one of:
an uplink grant ratio and/or a downlink grant ratio, an uplink subframe ratio and/or a downlink subframe ratio, or uplink data traffic and/or downlink data traffic, the uplink subframe ratio being determined based on an actual quantity of retransmission times of a same uplink grant, the downlink subframe ratio being determined based on an actual quantity of retransmission times of a same downlink grant, the uplink data traffic being determined based on a quantity of uplink grants and a transport block size (TBS) of each uplink grant, and the downlink data traffic being determined based on a quantity of downlink grants and a TBS of each downlink grant.

14. The user equipment according to claim 12, wherein the modem traffic information comprises a downlink grant ratio, a downlink subframe ratio, and/or a downlink data traffic;
the indication information instructs the base station to increase a long Discontinuous Reception (DRX) cycle in the CDRX of the user equipment, or instructs the base station to adjust the CDRX of the user equipment to another cycle, a long DRX cycle in the other cycle is greater than a long DRX cycle in the current CDRX cycle of the user equipment; and
the condition comprises a condition that the modem traffic information is less than a threshold.

15. The user equipment according to claim 14, wherein the CDRX of the user equipment further comprises a short DRX cycle, the indication information further instructs the base station to disable the short DRX cycle in the CDRX of the user equipment.

16. The user equipment according to claim 14, wherein the condition further comprises conditions that:
there is no dedicated bearer on the user equipment, channel quality of the user equipment is greater than a quality threshold, the user equipment is in a screen-off state, and there is no Over The Top (OTT) call on the user equipment.

17. The user equipment according to claim 12, wherein the modem traffic information comprises an uplink grant ratio, an uplink subframe ratio, and/or an uplink data traffic;
the indication information instructs the base station to reduce a long Discontinuous Reception (DRX) cycle in the CDRX, or instructs the base station to adjust the CDRX to another cycle, a long DRX cycle in the other cycle being less than a long DRX cycle in the current CDRX cycle; and
the condition comprises a condition that the modem traffic information is greater than a threshold.

18. The user equipment according to claim 17, wherein the other cycle is a default CDRX cycle.

19. The user equipment according to claim 17, wherein the condition further comprises at least one of the following conditions:
there is a dedicated bearer on the user equipment, channel quality of the user equipment is less than or equal to a threshold, the user equipment is in a screen-on state, or there is an Over The Top (OTT) call on the user equipment.

20. A non-transitory readable storage medium, wherein the readable storage medium stores instructions, that when executed by a baseband processor of a modem within a device, enable the baseband processor to perform functions comprising:
detecting modem traffic information that includes information regarding traffic between the modem and a base station;
determining whether the detected modem traffic information meets a condition;
sending indication information to the base station in response to the determination that the detected modem traffic information meets the condition, wherein the indication information instructs the base station to adjust a connected discontinuous reception (CDRX) cycle of the user equipment;

receiving configuration information sent by the base station, wherein the configuration information comprises CDRX information of the user equipment; and configuring the CDRX cycle of the user equipment by using the configuration information.

\* \* \* \* \*